(12) United States Patent
Ito

(10) Patent No.: US 8,355,577 B2
(45) Date of Patent: Jan. 15, 2013

(54) IMAGE PROCESSING APPARATUS AND METHOD

(75) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 12/506,044

(22) Filed: Jul. 20, 2009

(65) Prior Publication Data

US 2010/0021059 A1 Jan. 28, 2010

(30) Foreign Application Priority Data

Jul. 23, 2008 (JP) .................................. 2008-189676

(51) Int. Cl.
*G06K 9/34* (2006.01)
(52) U.S. Cl. ......... 382/173; 382/171; 382/180; 382/164
(58) Field of Classification Search .................. 382/173, 382/199, 232, 257, 164, 103, 285, 154, 171, 382/180; 348/222.1, 161, 207.99; 358/1.9, 358/2.99, 2.1, 1.13; 345/424, 679
See application file for complete search history.

(56) References Cited

U.S. PATENT DOCUMENTS

| 6,999,117 B2 * | 2/2006 | Yamazaki .................. 348/222.1 |
| 2006/0001932 A1 | 1/2006 | Sekiguchi .................... 358/537 |
| 2009/0083318 A1 | 3/2009 | Ito ............................ 707/103 R |

FOREIGN PATENT DOCUMENTS

| JP | 5-67186 | 3/1993 |
| JP | 2006-18522 | 1/2006 |
| JP | 2006-107290 A | 4/2006 |

OTHER PUBLICATIONS

Japanese Office Action issued on Jul. 3, 2012, in counterpart Japanese application No. 2008-189676.

* cited by examiner

*Primary Examiner* — Anh Hong Do
(74) *Attorney, Agent, or Firm* — Fitzpatrick, Cella, Harper & Scinto

(57) ABSTRACT

The operability of a user when reusing a vectorized illustration is improved. An image processing apparatus of the present invention comprises an illustration region specifying component configured to specify an illustration region within an input image, a color region extracting component configured to extract a color region from the specified illustration region, a contour line extracting component configured to extract a contour line from the extracted color region, a vector data generating component configured to generate vector data from image data of the illustration region, a kind discriminating component configured to discriminate a kind of the generated vector data, and a circumscribed rectangle coordinate deriving component configured to derive circumscribed rectangle coordinates in accordance with the kind discriminated by the kind discriminating component.

17 Claims, 21 Drawing Sheets

IMAGE PROCESSING APPARATUS AND METHOD

BACKGROUND OF THE INVENTION

1. Field of the Invention

The present invention relates to an image processing system, a method, and programs for reusing vectorized illustrations and figures.

2. Description of the Related Art

Conventionally, a method is performed, which divides scanned image data into individual objects, such as character, figure, and illustration, according to their attribute and vectorizes the image data for each region of the divided object (for example, refer to Japanese Patent Laid-Open No. H05-67186 (1993) and Japanese Patent Laid-Open No. 2006-18522). Then, the illustration etc. vectorized for each object is frequently reused when an illustration etc. is newly created. In a reusing method, for example, it is possible to enlarge or reduce a desired illustration by performing an operation (dragging a mouse on an application etc.) of a circumscribed rectangle of a divided object. Further, by splitting up the group of the vectorized object regions, it is also possible to reuse an object by enlarging/reducing it in units of elements (vector data) constituting the object region.

However, there is a problem that when object image data to be reused is a part of an illustration image created by graphics software etc., it is more difficult to reuse the object image data compared to the case where an original illustration image itself is reused as it is. This is because if the group of vectorized illustration image data is split up, its circumscribed rectangle remains as it is and an appropriate circumscribed rectangle in accordance with the shape etc. of the part of an illustration image to be reused is not displayed.

FIG. 18 shows an example of a case where the group of illustration images vectorized by the above-mentioned prior art is split up. Reference number 1801 of FIG. 18(*a*) denotes a circumscribed rectangle, showing a range into which the region is divided and cut out as an illustration region. The circumscribed rectangle (region) includes three elements and a combination of these elements forms one illustration region. That is, three rings 1805, 1806, and 1807 are drawn and one illustration region is configured in such a manner that each ring is almost in contact with the other two rings substantially the same distance apart from one another. FIG. 18(*b*) shows a state where the group is split up after they are vectorized. As shown in FIG. 18(*b*), circumscribed rectangles 1802, 1803, and 1804 having the same size as that of a circumscribed rectangle 1801 of the overall illustration region are attached to respective elements 1805, 1806, and 1807. Further, these circumscribed rectangles 1802, 1803, and 1804 are displayed overlapped on one another (in FIG. 18(*b*), those which are originally overlapped on one another are shown separated).

In such circumstances, when operating vector data in units of components after splitting up the group, it is difficult to grasp whether desired vector data is selected appropriately. Further, there is a problem that an appropriate circumscribed rectangle in accordance with each vector data after the group is split up is not displayed, and therefore, the visual recognizability is deteriorated when it is enlarged or reduced and the operability is also deteriorated as a result.

SUMMARY OF THE INVENTION

An object of the present invention is to improve the user operability when reusing a vectorized illustration.

An image processing apparatus of the present invention comprises an illustration region specifying component configured to specify an illustration region within an input image, a vector data generating component configured to generate vector data from the image data of the illustration region, a kind discriminating component configured to discriminate a kind of the generated vector data, and a circumscribed rectangle coordinate deriving component configured to derive circumscribed rectangle coordinates in accordance with the kind discriminated by the kind discriminating component.

With the present invention, the user operability when reusing a vectorized illustration is improved.

Further, according to the present invention, a circumscribed rectangle including a control point(s) is displayed, and therefore, it is possible for a user to grasp each vector description intuitively and the operation of vector data is facilitated when it is reused in a PC etc.

Further features of the present invention will become apparent from the following description of exemplary embodiments (with reference to the attached drawings).

DESCRIPTION OF THE EMBODIMENTS

[First Embodiment]

A first embodiment of an image processing method according to the present invention will be described based on the drawings.

Figure 1:
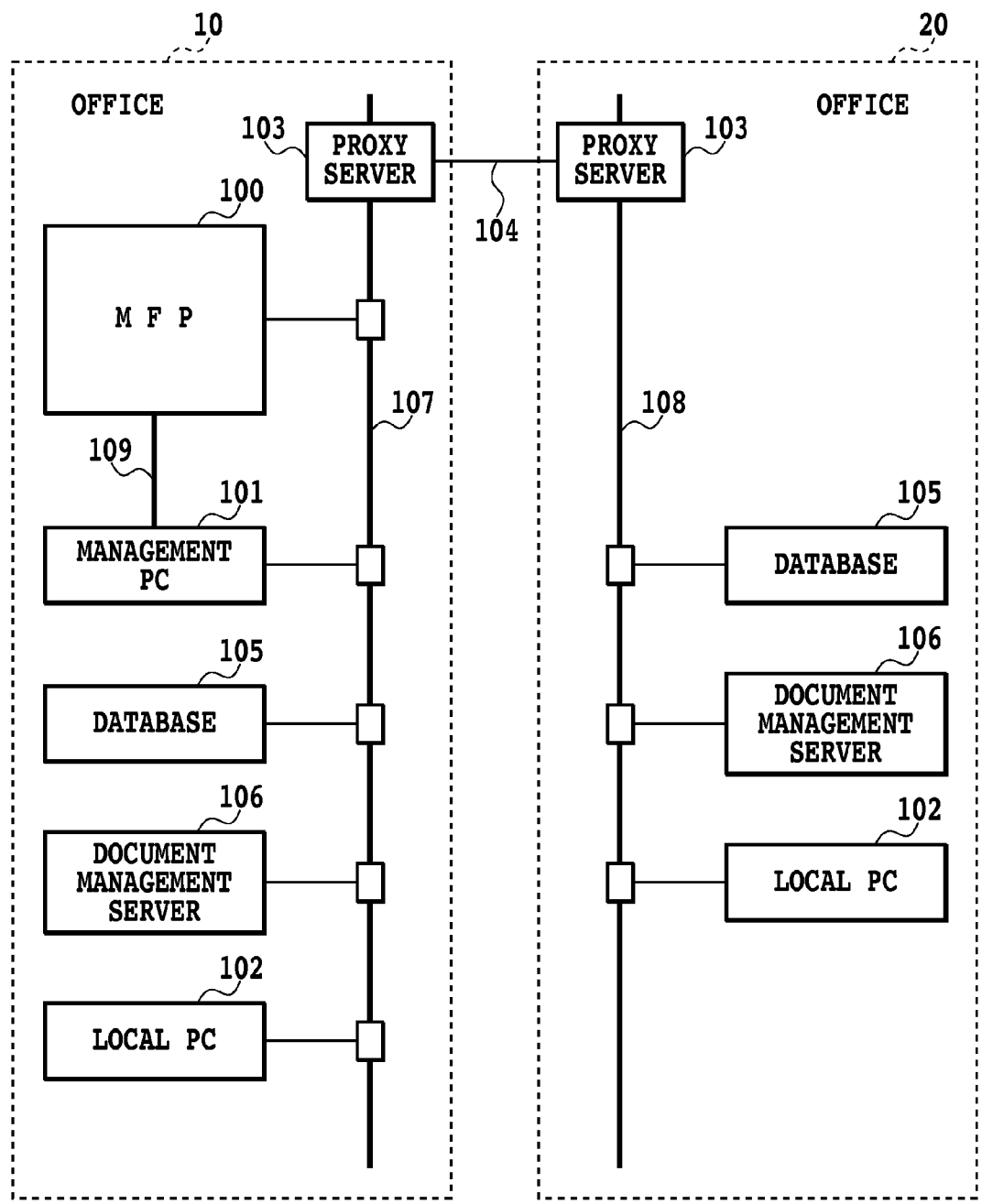
FIG. 1 is a block diagram showing an image processing apparatus according to the present invention.
Figure 2:
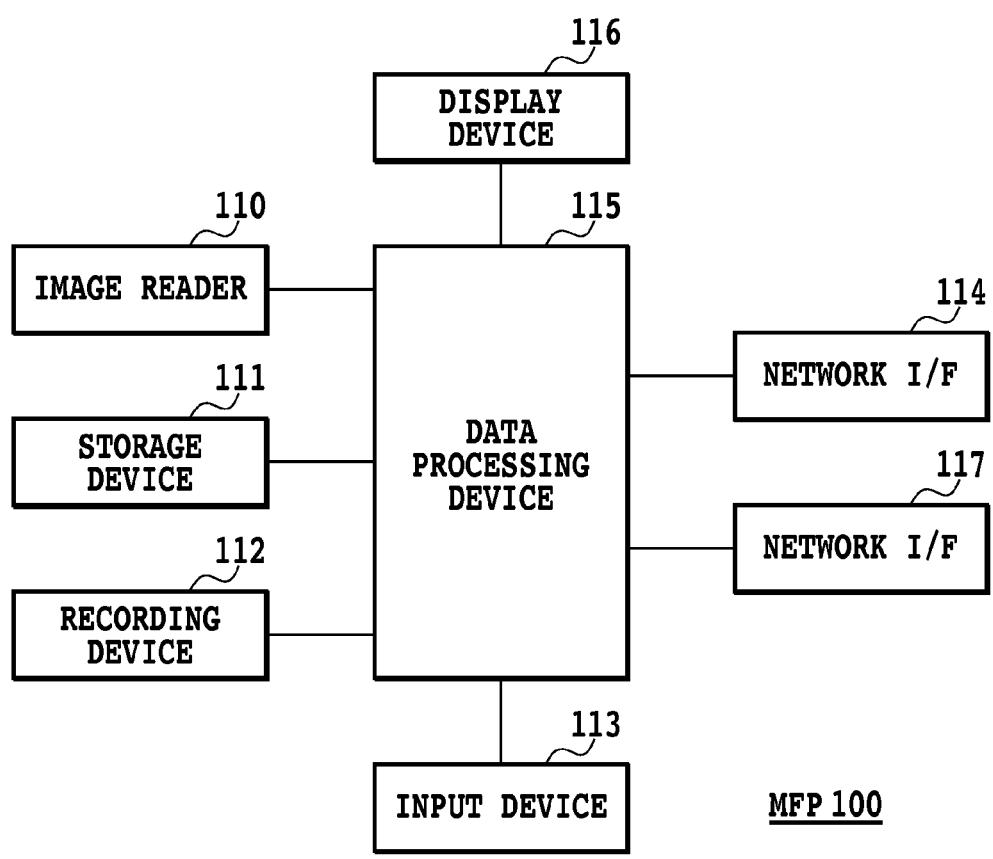
FIG. 2 is a block diagram showing an MFP in FIG. 1.

FIG. 1 is a block diagram showing an image processing system according to the present invention. FIG. 2 is a block diagram showing a configuration of an MFP (Multi Function Printer) in FIG. 1.

(About Image Processing System)

In FIG. 1, the image processing system according to the present invention is used in an environment in which an office 10 and an office 20 are connected via the Internet 104.

To a LAN 107 constructed in the office 10, an MFP 100, which is a complex machine as a recorder, is connected. Further, to the MFP 100, a management PC 101 that controls the MFP 100, a local PC 102, a document management server 106, and a database 105 for the document management server 106 are connected.

In the office 20, a LAN 108 is constructed and to the LAN 108, the document management server 106 and the database 105 for the document management server 106 are connected.

To the LANs 107, 108, a proxy server 103 is connected and the LANs 107, 108 are connected to the Internet via the proxy server 103.

The MFP 100 is in charge of part of image processing of an input image read from a document and has a function to input image data, as the result of the processing, into the management PC 101 through a LAN 109. The MFP 100 also functions as a printer that interprets and prints data written by page description language (herein after, referred to simply as "PDL") transmitted from the local PC 102 or a general-purpose PC, not shown schematically. Further, the MFP 100 also has a function to transmit an image read from a document to the local PC 102 or a general-purpose PC, not shown schematically.

The management PC 101 is a normal computer that includes an image storing component, an image processing component, a displaying component, an inputting component, etc. Parts of these components of the management PC 101 are integrated with the MFP 100, constituting components of the image processing system.

Further, the MFP 100 is connected directly to the management PC 101 through the LAN 109.

(About MFP)

In FIG. 2, the MFP 100 comprises an image reader 110 having an ADF (Auto Document Feeder), not shown schematically. After taking in a document or a bundle of documents using the ADF, the image reader 110 irradiates the image of the document with light from a light source and forms its reflected image onto a solid state image sensor using a lens. The solid state image sensor generates an image read signal with a predetermined resolution (for example, 600 dpi) and a predetermined luminance level (for example, 8 bits) and thus image data including raster data (bitmap image data) is created from the image read signal.

The MFP 100 has a storage device 111 and a recorder 112. When a normal copying function is executed, first, a data processing device 115 performs image processing for copying on the image data created by the image reader 110. After the image data having been subjected to image processing is converted into a record signal, a record image in accordance with the record signal is formed on a recording sheet in the recorder 112. When two or more documents are copied, record signals are once stored and held in the storage device 111 for each document, and then, they are output sequentially to the recorder 112, and thus, a record image is formed on a recording sheet.

The MFP 100 has a network I/F (interface) 114 for a connection with the LAN 107. Via the network I/F 114, the data processing device 115 receives PDL data converted by the local PC 102 or another general-purpose PC, not shown schematically, using a printer driver. Then, the data processing device 115 interprets/processes (image development processing) the received PDL data and forms a record image by the recorder 112. That is, after the PDL data from the local PC 102 passes through the LAN 107 and the network I/F 114 and is developed into a recordable signal in the data processing device 115, it is recorded on a recording sheet as an image in the recorder 112.

The recorder 111 is configured by, for example, a RAM etc., and has a function capable of performing rendering of data from the image reader 110 or PDL data output from the local PC 102 and storing data formed into an image.

The MFP 100 is operated through an input device 113, such as a key operating component, provided to the MFP 100 itself or an input device (not shown schematically), such as a keyboard and a pointing device, provided to the management PC 101. According to these operations, the data processing device 115 performs predetermined control by an internal controller (not shown schematically).

The MFP 100 has a display device 116 (for example, a liquid crystal display etc.) as a user interface. With the display device 116, it is possible to display a state of input operation by a user and image data to be processed.

The storage device lll can also be controlled directly by the management PC 101 via a network I/F (interface) 117. The LAN 109 is used for transmission/reception of data and control signals between the MFP 100 and the management PC 101.

(About Storage for Each Object)

Figure 3:
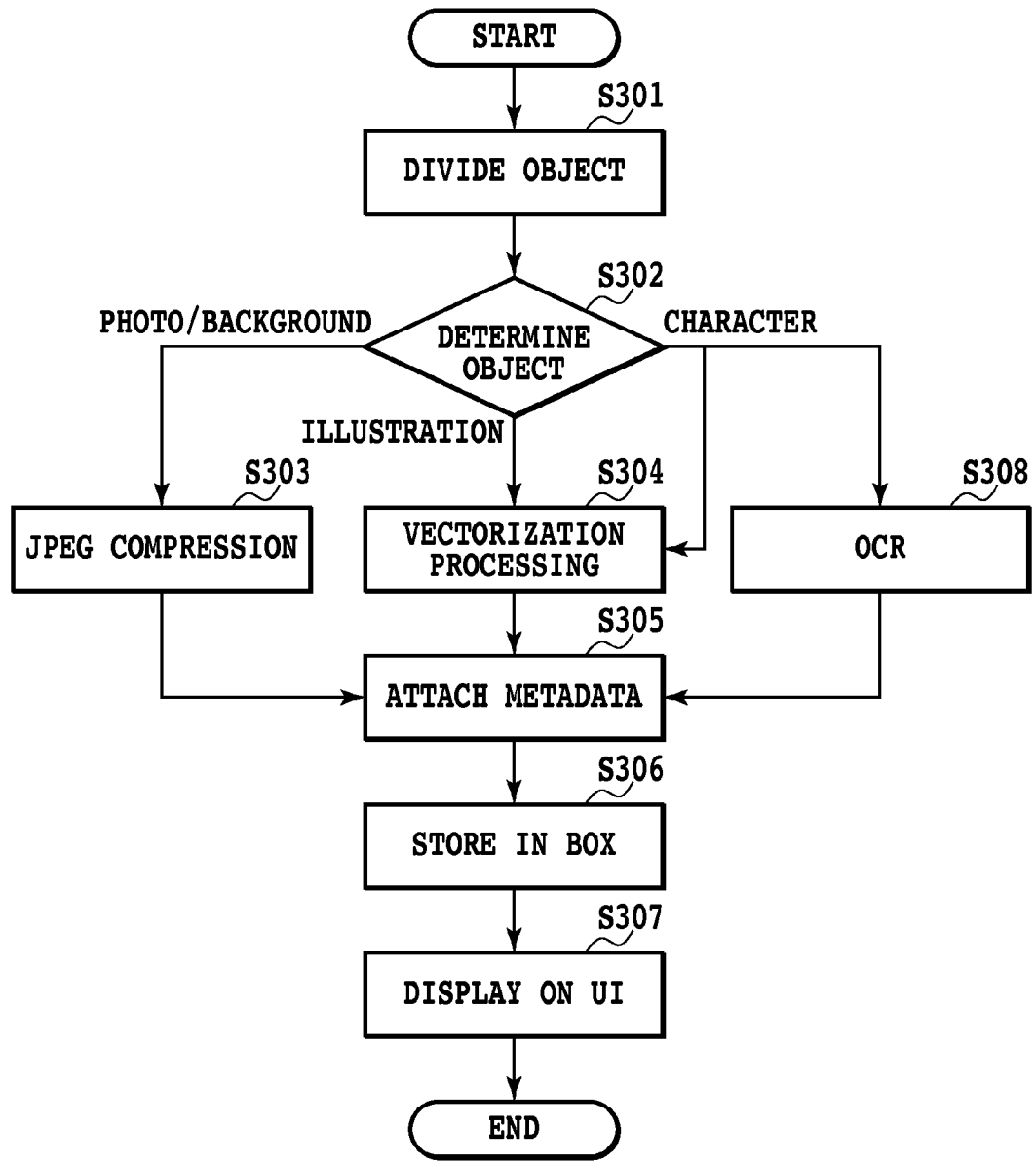
FIG. 3 is a diagram showing a flowchart of an image processing apparatus to be described in a first embodiment.

FIG. 3 shows a flowchart for storing bitmap image data for each object. Bitmap image data includes data acquired by the image reader 110 of the MFP 100 described above and data obtained by performing rendering processing of a document created by application software on the local PC 102 inside the MFP 100.

First, in S301, processing to divide a region according to the attributes of elements constituting an image is performed. By this object division processing, an image is divided into object regions for each element of character, photo (natural image), illustration (figure, line drawing, table), and background.

In the present specification, the term "photo" refers to an image in which pixels of the same color constituting an image, such as a natural image, are comparably discrete and the number of colors that appear is larger than or equal to a predetermined number of colors (for example, 256 gradations). On the other hand, the term "illustration" refers to an image, such as a computer graphics image created artificially by graphics software etc., and its contour of an object is clearer compared to a natural image, and its number of colors that appear is less than or equal to a predetermined number of colors (for example, 256 gradations). Then, any image that is not a character or background and which includes both photo and illustration is generally referred to as a "graphic".

The kind of an object (character, photo, illustration, background) is determined in S302 for each of the divided object regions while it remains bitmap image data.

When determined to be a photo or background, the object is compressed into JPEG format in S303 while it remains a bitmap.

When the result of object determination is an illustration, the object is subjected to vectorization processing and converted into data with a path in S304.

When the result of object determination is a character, first, in S304, the character is subjected to vectorization processing as an illustration and converted into path data. Simultaneously, in S308, OCR processing is performed and the character is converted into character-coded data.

After all of the object data and character-coded data are put together into one file, optimum metadata is given to each object (S305). Each object to which metadata is given is stored in the storage device 111 incorporated in the MFP 100 in step S306. All of the stored objects to which metadata is given are displayed on the screen of the display device 116 in S307.

(About Creation of Bitmap Image Data)

First, acquisition by the image reader of the MFP 100 will be described. In this case, a document is read by a scanner included in the image reader and thereby an image on the document is read. The read image is already bitmap image data. Then, image processing is performed if necessary so that the data is suitable for recording, such as printing. The image processing depends on a scanner and, for example, color processing or filter processing is performed.

Next, rendering processing of a document created by application software on the PC 102 within the MFP 100 will be described.

Figure 6:
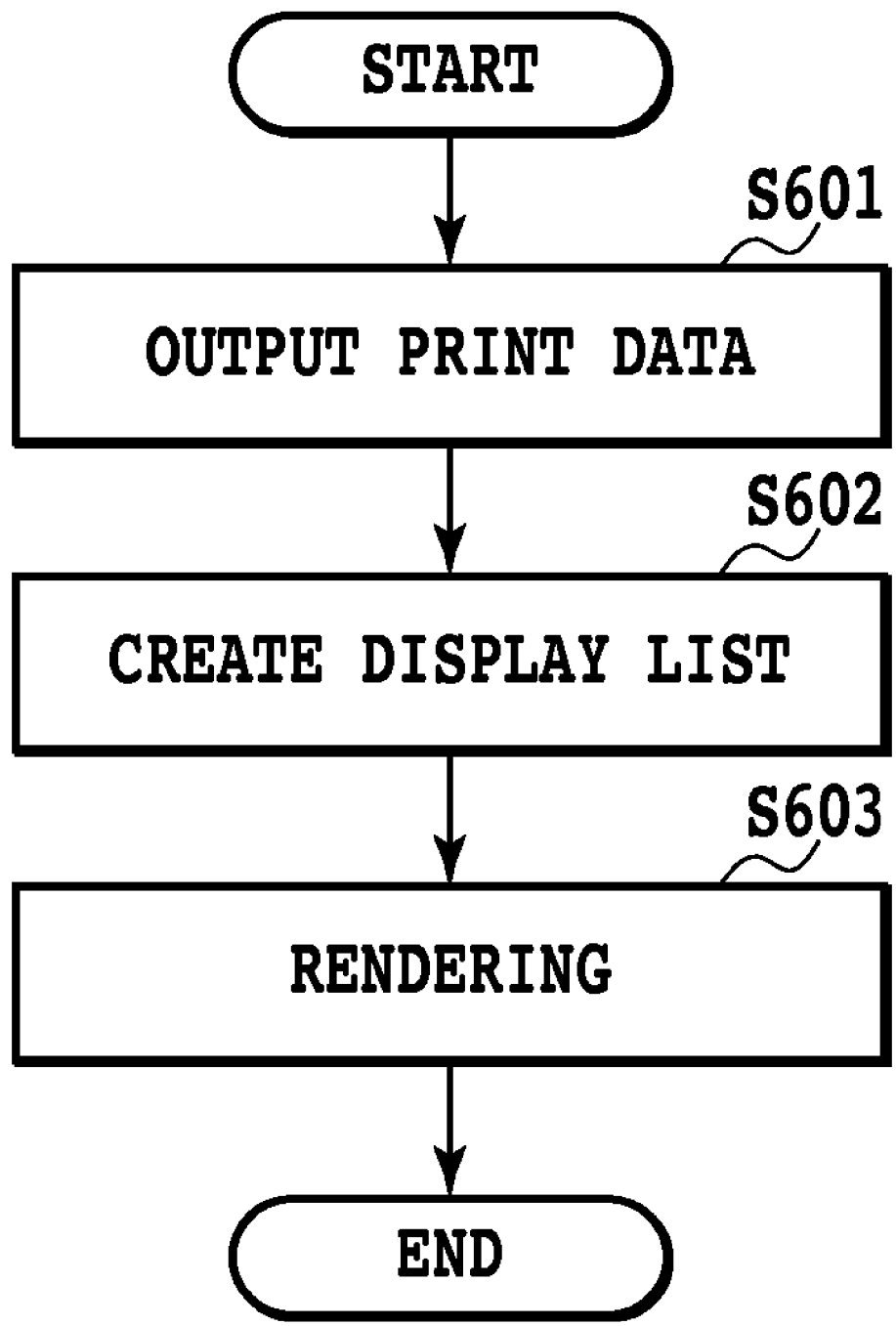
FIG. 6 is a flowchart for turning data from a PC into bitmap data to be described in the first embodiment.

The image data, which serves as a base, created by using the application software on the PC 102 is converted into PDL data by a printer driver on the PC 102 in step 601 in FIG. 6 and transmitted to the MFP 100. Here, as an example of PDL, mention is made of, for example, LIPS (registered trademark) and Postscript (registered trademark). Next, in step 602, the PDL data is analyzed by an interpreter within the MFP 100 and a display list is generated. By rendering the display list, bitmap image data is generated (S603).

For the bitmap image data generated in the above-mentioned two examples, the aforementioned object division processing (S301 in FIG. 3) is performed.

Next, a document read by the image reader 110 will be described using FIG. 4.

Figure 4:
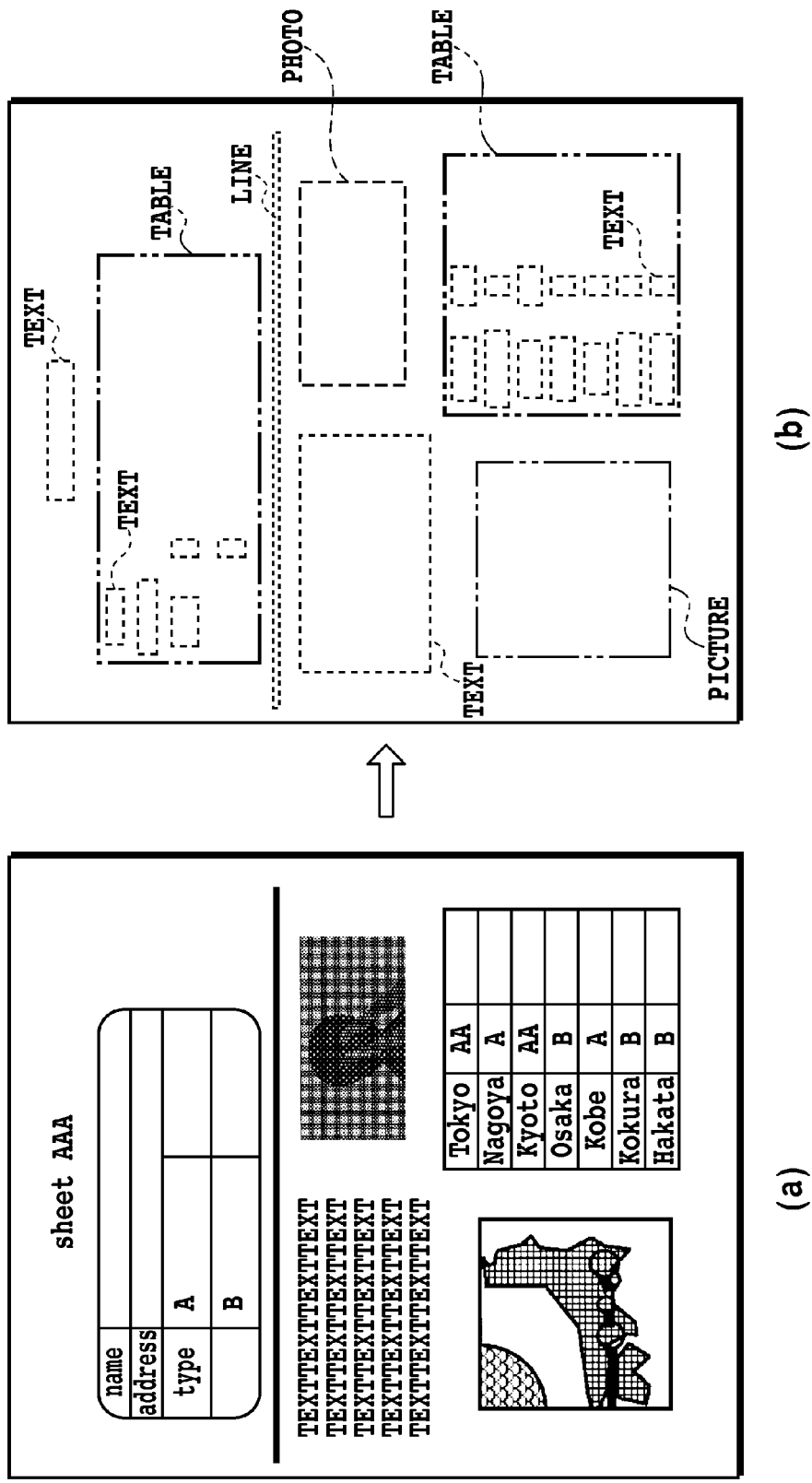
FIG. 4 is a diagram showing a sample of a document image and an example of region division to be described in the first embodiment.

FIG. 4 is a diagram showing a sample of a document read by the image reader 110 and an example when object division processing is performed for the read image data.

The document shown in FIG. 4(*a*) is a sheet of paper printed by an output device, such as a printer, including characters and graphic images. The characters include two kinds of character, one is a large character, such as that in a title, and the other is a comparatively small character, such as that in an explanatory sentence. The graphic images include two kinds of image, that is, a photo image and an illustration image having the number of colors that appear comparatively smaller than that of the photo image.

The document on which such characters and graphic images are printed is read by an image reading device, such as an image scanner, and for the read image data, object division processing is performed, and thus the document is divided into each object region as shown in FIG. 4(*b*). That is, a TEXT region, an illustration (LINE, TABLE, PICTURE) region, and a PHOTO region are obtained.

Figure 7:
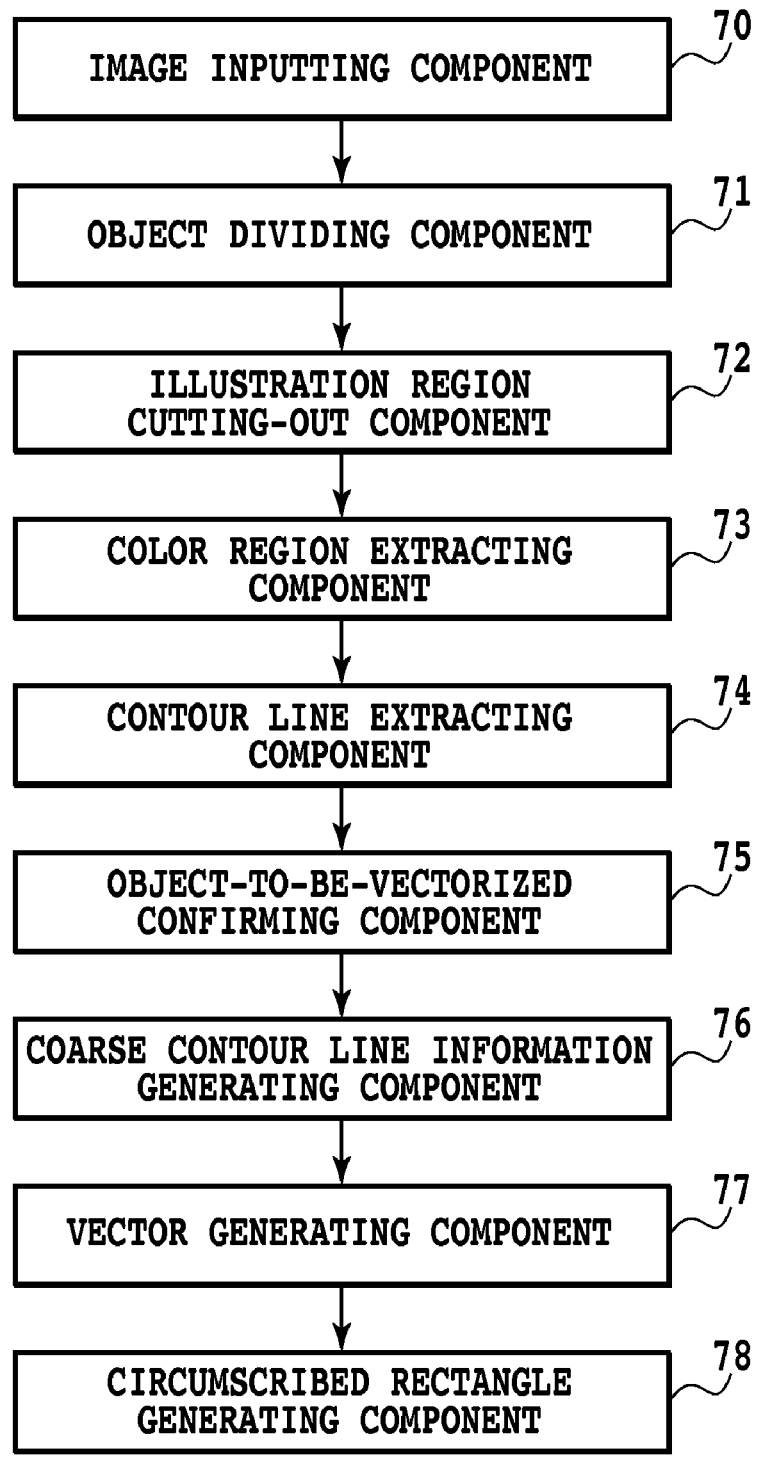
FIG. 7 is a block diagram showing an image processing system according to the first embodiment.

FIG. 7 is a block diagram showing a configuration of an image processing apparatus in an embodiment of the present invention.

Reference number 70 denotes an image inputting component, for example, an image reading device such as a scanner, corresponding to the image reader 110 in FIG. 2. From here, image data to be processed is input and taken in as an input image.

Reference number 71 denotes an object dividing component, which divides input image data according to its attribute for each object as described using FIG. 4. Here, there is no restriction to the shape of an object when divided and, for example, a rectangle is used. In the case of FIG. 4, the image is divided into rectangular regions according to the respective attributes, such as the TEXT region, LINE region, TABLE region, PICTURE region, and PHOTO region. The rest of the regions of the image, that is, regions other than the divided regions, are the background region. In this manner, a region is specified for each of the various objects included in the input image and the specification in the first stage of the illustration region to be processed into vector data is performed.

Reference number 72 denotes an illustration region cutting-out component, which performs processing to cut out an arbitrary illustration region from the illustration regions obtained by the object dividing component 71. That is, there are two cases when cutting out an illustration region. In one case, the whole region, which is an illustration region by object division, is cut out as is and in the other case, only part of the illustration region is cut out. This processing is illustration region specifying processing in the second stage, in which the object to be processed into vector data is further narrowed from the illustration region specified within the input image. For a user who wishes to further narrow the object for the illustration region obtained by the object division, it is possible to select only the image data of the region that is desired to be processed into vector data from the illustration having been subjected to object division. In order to vectorize only part of the illustration region, it is only required to make it possible for the user to select a desired illustration region using the publicly-known technique, such as the touch pen system, in the above-described user interface 116.

Reference number 73 denotes a color region extracting component, which performs processing to extract a color region (color image data) for each color that appears for each image element constituting the illustration region cut out by the illustration region cutting-out component. When there are two or more figures in the illustration region, there must be color boundaries between the respective figures, and therefore, the figures are finally recognized as separate elements, but in this color region extracting step, the figures are classified into groups according to their representative colors. Conversely saying, even in a single figure, if it is divided by different colors, the parts of different colors are extracted as different color regions. For example, when the upper half of a circle is blue and the lower half is red, the semicircular blue part and the semicircular red part are extracted as separate color regions.

Reference number 74 denotes a contour line extracting component, which performs, for each extracted color region, processing to extract a contour line of a figure or line included therein. By this processing, it is possible to obtain image data expressing a contour line of a figure and line according to colors.

Figure 18:
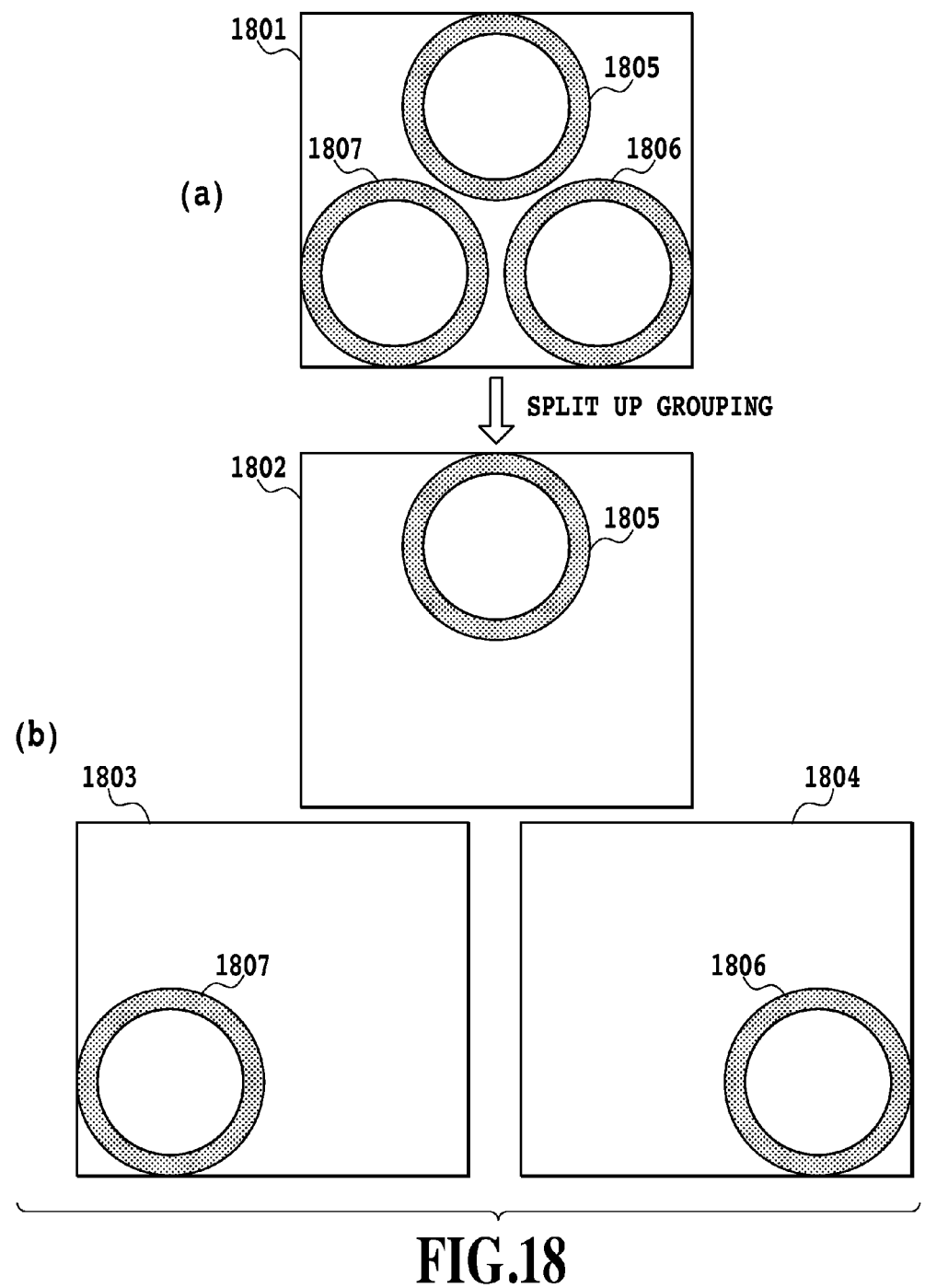
FIG. 18 is a diagram showing an example of a conventional problem.

The relationship between the processing of the color region extracting component 73 and that of the contour line extracting component 74 will be described as follows using the example of the illustration region 1801 shown in FIG. 18 (it is assumed that the ring 1805 is red and the rings 1806 and 1807 are blue). First, the red color region (1805) and the blue color regions (1806 and 1807) are extracted by the color region extracting component 73. In this stage, only the grouping according to colors is performed and what kinds of shape are included is not recognized. Next, the contour line extracting component 74 extracts a line and figure (plane) included in the color region in question for each color and then the red ring (1805) and the blue rings (1806 and 1807) are extracted. In this manner, the color region and the contour line are extracted.

Reference number 75 denotes an object-to-be-vectorized confirming component, which confirms an object to be vectorized. Specifically, processing to confirm an object to be vectorized is performed, that is, whether the object is vectorized in units of contour lines extracted by the contour line extracting component 74 or in units of regions cut out by the illustration region cutting-out component 72 is confirmed. When the object is vectorized in units of cut-out regions, all of the color regions and contour lines constituting the illustration region in question are put into one group (grouping). If convenience of reusing in the future is taken into consideration and it is desired to perform vectorization in advance in smaller units, it is recommended to perform vectorization for each color region or for each further smaller contour line. If the vectorization is performed in smaller units, it is possible to make use of the same technique as that of the above-mentioned illustration region extracting component 72. That is, each color region and each contour line, a subordinate element of the color region, are displayed in the user interface 116 so that it is made possible for a user to select an element desired to be vectorized using the publicly-known technique, such as the touch-pen system. Alternatively, it may also be possible to automatically determine an object to be vectorized by making setting in advance by, for example, programming vectorization conditions.

Reference number 76 denotes a coarse contour line information generating component, which performs, particularly in the present embodiment, processing to generate a description of a draw command that defines the contour line (for example, a path command of SVG) as coarse contour line information when expressing a contour line by vector data. The coarse contour data generated here is vector data expressed only by a straight line(s) and generally called a short vector (refer to FIG. 11(*a*) and FIG. 12(*a*)).

Figure 9:
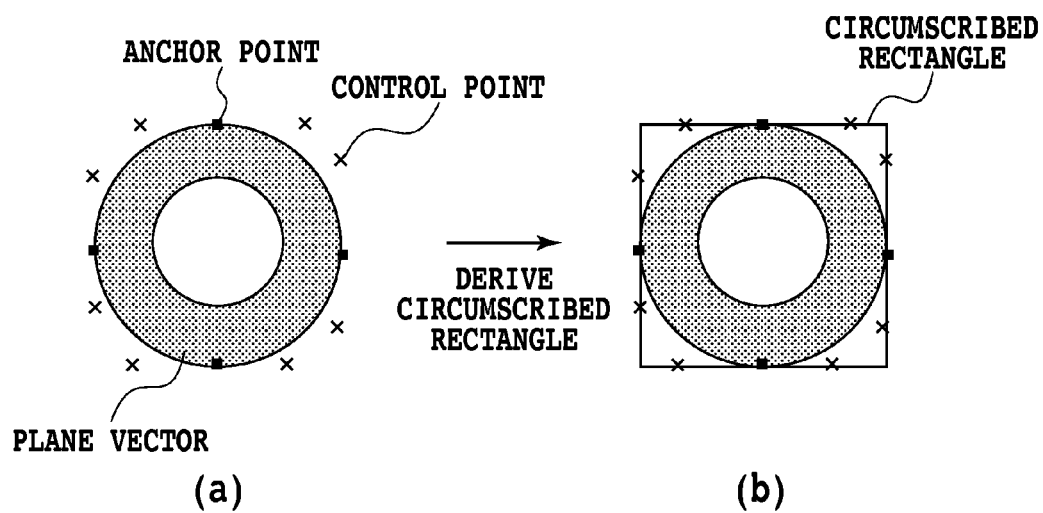
FIG. 9 is a diagram showing an example of plane vector data and a circumscribed rectangle attached thereto according to the present invention.
Figure 10:
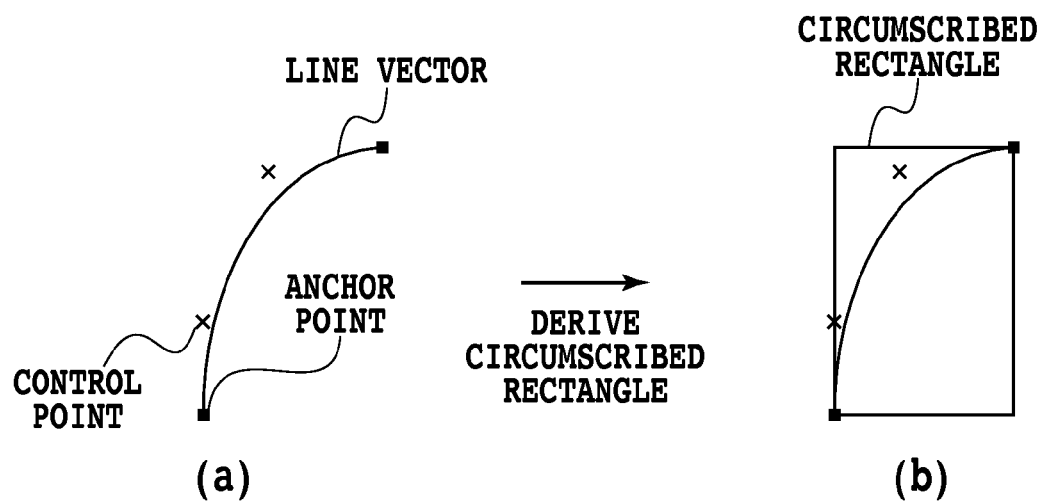
FIG. 10 is a diagram showing an example of line vector data and a circumscribed rectangle attached thereto according to the present invention.

Reference number 77 denotes a vector generating component, which performs function approximation processing of the coarse contour data generated by the above-mentioned coarse contour line information generating component 76 to generate smooth vector data (refer to FIG. 9(*a*) and FIG. 10(*a*)). Here, for the function approximation, for example, the publicly-known spline function and the Bezier function are used. As described above, vector data in a wide meaning is generated by the coarse contour line information generating component 76 and the vector generating component 77.

Reference number 78 denotes a circumscribed rectangle generating component, which performs, particularly in the present embodiment, processing to detect coordinates which circumscribes the vectorized region. The circumscribed rectangle generating component 78 will be described later in detail.

The working of each component described above will be described with reference to FIG. 18. First, a document is read in the image inputting component 70 and subsequently, the object dividing component 71 divides an illustration region including three rings. Next, the illustration region cutting-out component 72 cuts out the region in which the three rings are drawn according to user selection etc. Then, after the color region extracting component 73 classifies the cut-out regions into elements according to their colors, the contour line extracting component 74 extracts each of the rings as a contour line. After that, it is confirmed by user selection or automatically that the three rings are vectorized as a single unit. Then, the coarse contour line information generating component 76 creates coarse contour data and after the vector generating component 77 turns the data into smooth vector data, the circumscribed rectangle generating component 78 attaches a circumscribed rectangle (1801).

An example of a processing method of an image processing apparatus to which the present invention has been applied will be described below with reference to the flowchart in FIG. 8.

First, in S801, the object dividing component 71 performs object division processing. In this processing, image data read by a scanner etc. is divided according to the attribute for each object, as described above.

Figure 5:
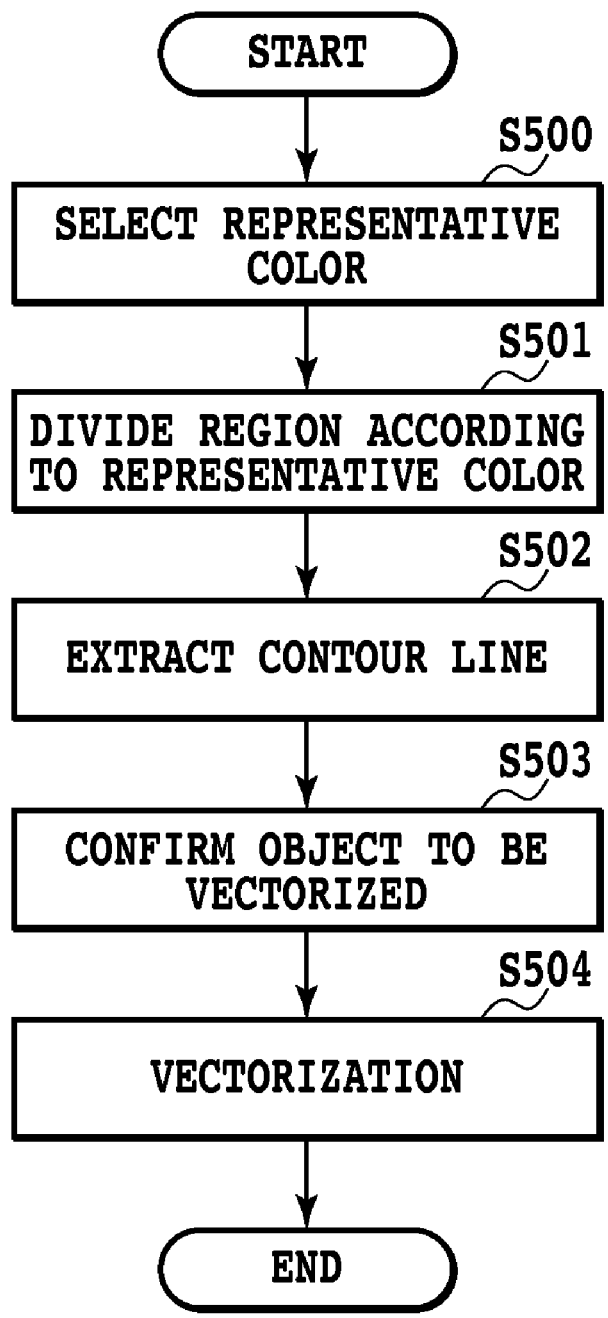
FIG. 5 is a diagram for illustrating vectorization processing of illustration region to be described in the first embodiment.

Subsequently, the illustration region cutting-out component 72 performs processing in S802. Here, the attribute of each object divided in S801 is checked and the kind of the object is determined. In the object determination in S802, when the object is determined to be a character region, the procedure is advanced to processing in S803. In S803, the coordinates of a rectangle into which the character part is cut out are acquired. Then, at the time of outputting in S813, the coordinates are attached as circumscribed rectangle coordinates each time a character is cut out. On the other hand, in the object determination in S802, when the object is determined to be an illustration region, the procedure is advanced to coarse contour extracting processing (S804). The coarse contour extracting processing will be described using the flowchart in FIG. 5.

First, the color region extracting component 73 selects a representative color for each color in the cut-out illustration region in S500. Following this, in S501, the color region extracting component 73 divides the region into regions each having its representative color according to the selected representative color and acquires color regions (color images).

Then, the contour line extracting component 74 extracts a contour line of an element, such as a figure (plane) and line, included therein for each color region divided in S501 (S503).

After the grouping based on the representative color for each color element by the color region dividing component 73 and the extraction of a contour line, such as a figure, by the contour line extracting component 74 are completed, the procedure is advanced to processing by the object-to-be-vectorized confirming component 75 in S503.

The object-to-be-vectorized confirming component 75 confirms whether to perform the vectorization of an object in units of cut-out illustration regions or in smaller units (color region units or contour line units).

Finally, the coarse contour line information generating component 76 vectorizes the region that is obtained to generate coarse contour data using the selected representative color and the extracted contour line for the illustration region to be vectorized (S504). This vectorization is realized by, for example, generating coarse contour line information in which the contour line is described by Path command and the inner color is described by Fill command in the description of SVG.

As described above, in S804, each of processing to select a representative color in the cut-out illustration region, processing to group color regions according to the selected representative color, processing to extract a contour line for each color region in question, and processing to generate coarse contour line information is performed.

Next, in S805, the vectorization generating component 77 performs function approximation processing based on the coarse contour data obtained in S804. Specifically, the function approximation processing is performed for the coarse contour line expressed by the coarse contour data (expressed by Path command etc. of SVG) extracted in the coarse contour extraction processing, and thereby smooth vector data is generated. As described above, for this function approximation, the publicly-known spline function, Bezier function, etc., are used.

Next, the circumscribed rectangle generating component 78 performs processing in S806 and the subsequent steps to obtain a circumscribed rectangle. First, in S806, the processing result determination is made as to whether or not the function approximation processing in S805 has been completed normally. The determination as to whether the processing has been completed normally is made by whether the function approximation processing is completed without the occurrence of an error. Examples of a case in which an error occurs in the function approximation processing include a case in which a memory region for functional approximation runs short because of too large a number of coordinate points, a case in which the coordinate point as a result of the approximation appears at a point too far, and so on.

When it is determined that the function approximation processing has been completed normally, processing to discriminate whether the kind of vector data generated by the function approximation processing is a line vector or plane vector is performed (S808). When it is determined that it is a plane vector, the procedure is advanced to processing to derive a circumscribed rectangle of the plane (S809). In S809, the coordinates of the circumscribed rectangle are derived based on the anchor point and control point of the outer contour constituting the plane vector. In more detail, the coordinates of the most distant upper-left, upper-right, lower-left, and lower-right points from all of the anchor points and control points for the plane vector are found and thus a rectangle circumscribing the plane vector is obtained. That is, it is possible to obtain the coordinates of a rectangle, which form a circumscribe rectangle, by determining arbitrary coordinate points, which serve as references, from a plurality of coordinate points and finding the maximum and minimum values for the X coordinate and Y coordinate based on the coordinate points. As to the method for finding coordinates of the most distant upper-left, upper-right, lower-left, and lower-right points based on a plurality of coordinate points, it is possible to apply a publicly-known method other than that described above.

FIG. 9 is a diagram showing an example of the derivation of a circumscribed rectangle for a plane vector in the shape of a doughnut. In FIG. 9(a), it is possible to confirm four anchor points and eight control points of the outer contour of the plane vector. The coordinates of a circumscribed rectangle are derived from all of the coordinate points of the anchor points and control points of the outer contour and a circumscribed rectangle as shown in FIG. 9(b) can be obtained.

When it is determined that the object is a line vector in S808, the procedure is advanced to processing to derive the coordinates of a circumscribed rectangle of a line (S810). In S810, a circumscribed rectangle is obtained based on anchor points and control points of the line vector. The method for obtaining a circumscribed rectangle in this case is the same as that in the case of a plane vector. That is, a rectangle circumscribing the line vector is obtained by finding the coordinates of the most distant upper-left, upper-right, lower-left, and lower-right points based on the coordinate points of all of the anchor points and control points of the line vector. FIG. 10 is a diagram showing an example of the derivation of a circumscribed rectangle of a line vector in the shape of an arc. In FIG. 10(a), it is possible to confirm two anchor points and two control points, respectively, of the line vector. The coordinates of a circumscribed rectangle are derived from all of the coordinate points of these anchor points and control points, and a circumscribed rectangle as shown in FIG. 10(b) can be obtained.

Figure 11:
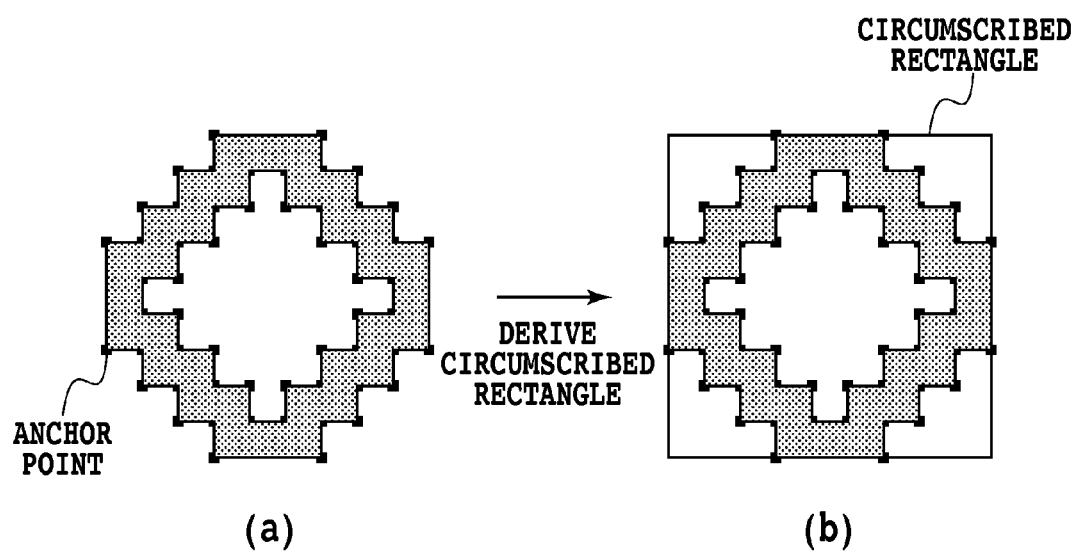
FIG. 11 is a diagram showing an example of plane coarse contour data and a circumscribed rectangle attached thereto according to the present invention.

On the other hand, when it is determined that the function approximation processing has not been completed normally in S806, the procedure is advanced to S807 and whether the contour line expressed by the above-mentioned coarse contour data is a line coarse contour or plane coarse contour is determined. When the result of the determination is a plane coarse contour, a circumscribed rectangle is obtained based on all of the anchor points of the outer contour constituting the plane coarse contour (S811). The method for obtaining a circumscribed rectangle is substantially the same as that in the case of S809 except in that there are no control points. That is, it is possible to obtain a rectangle circumscribing the plane coarse contour by finding the coordinates of the most distant upper-left, upper-right, lower-left, and lower-right points based on the coordinate points of all of the anchor points of the plane vector. FIG. 11 is a diagram showing an example of the derivation of a circumscribed rectangle of the plane coarse contour. In FIG. 11(a), it is possible to confirm 56 anchor points in total, that is, 28 anchor points for each of inside and outside of the plane coarse contour. The coordinates of a circumscribed rectangle are derived from all of the coordinate points of these anchor points and a circumscribed rectangle as shown in FIG. 11(b) can be obtained.

Figure 12:
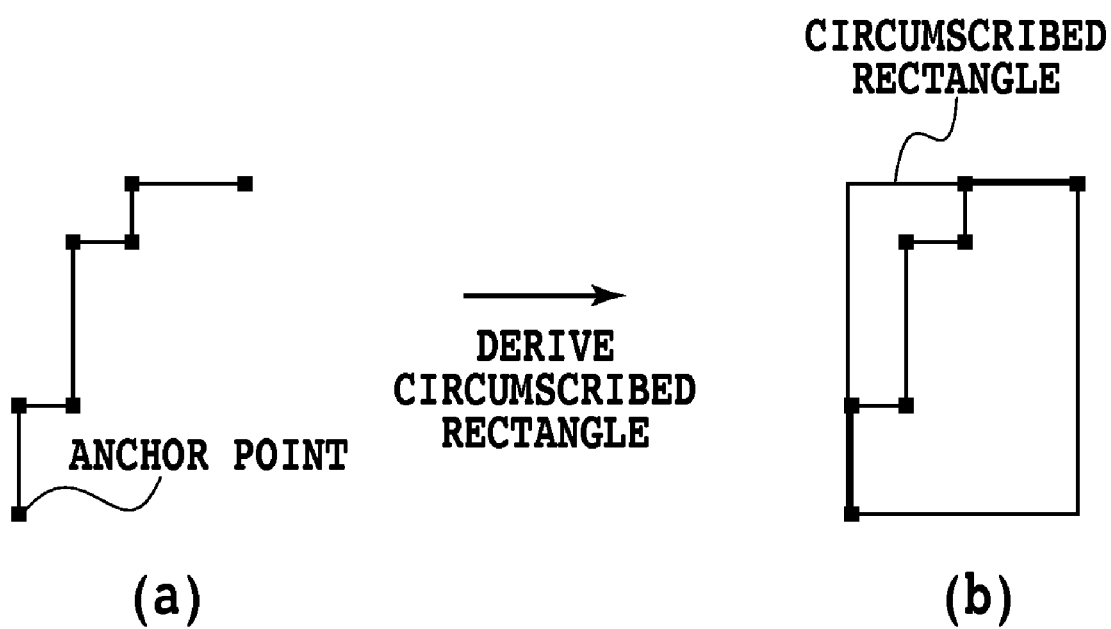
FIG. 12 is a diagram showing an example of line coarse contour data and a circumscribed rectangle attached thereto according to the present invention.

When the result of determination in S807 is a line coarse contour, it is also possible to obtain a rectangle circumscribing the line coarse contour by the method substantially the same as that in the case of plane coarse contour. FIG. 12 is a diagram showing an example of the derivation of a circumscribed rectangle of the line coarse contour. In FIG. 12(a), it is possible to confirm seven anchor points of the line coarse contour. The coordinates of a circumscribed rectangle are derived from all of the coordinate points of these anchor points and a circumscribed rectangle as shown in FIG. 12(b) can be obtained.

As described above, the coordinates of a circumscribed rectangle are derived in accordance with the result of the determination as to whether or not the function approximation processing has been completed normally and the result of the discrimination of the kind of vector data.

When each processing in S803, S809, S810, S811, and S812 is completed, the procedure is advanced to output description processing in S813.

In S813, the output description of vector data to which coordinates indicating the above-described circumscribed rectangle are attached is performed. The output description may change according to the format to be output and the output processing is changed according to the format and the output description is performed for an appropriate drawing description. For example, this output description is performed by generating the above-described SVG Path command.

Figure 16:
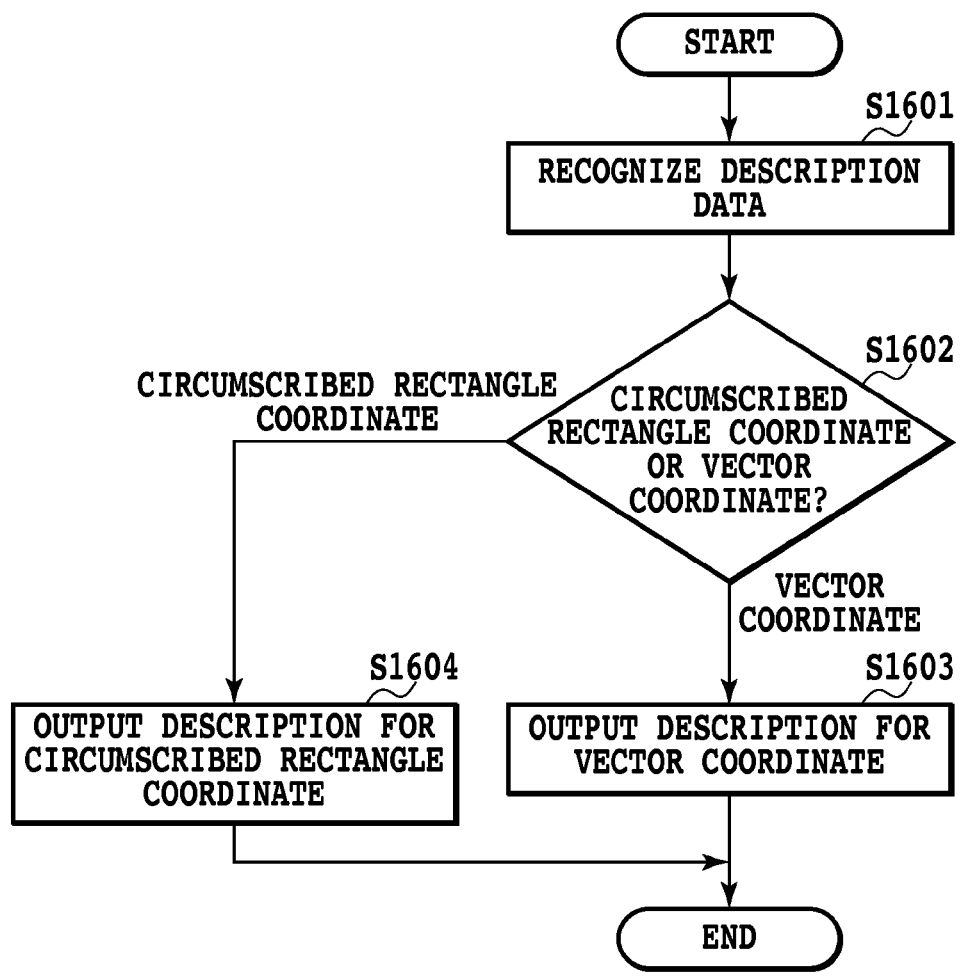
FIG. 16 is a diagram showing a flowchart of a fourth embodiment.

FIG. 16 is a flowchart showing the detail of the output description processing. First, in S1601, processing to recognize data for output description is performed. Here, the target of recognition is the coordinates of a circumscribed rectangle and the coordinates of vector data. Next, whether the recognized coordinates are the coordinates of a circumscribed rectangle or the coordinates of vector data is determined (S1602).

When the coordinates are determined to be the coordinates of vector data, output description for the vector coordinate is performed (S1603). At this time, the output description for the vector data coordinate is performed with bit precision determined in advance. For example, when output with float precision is specified, the output description is performed with float precision.

In the case of the coordinates of a circumscribed rectangle, the output description for the circumscribed rectangle coordinate is performed (S1604). At this time, the output description for the coordinates of a circumscribed rectangle is performed with bit precision determined in advance. For example, when output with int precision is specified, the output description is performed with int precision.

The processing to determine the bit precision of the output description is not necessarily required to be performed in the stage in which the output description in S813 is performed. It is possible to obtain the same result by reflecting the bit precision when performing the function approximation processing and reflecting the bit precision of the circumscribed rectangle when deriving the coordinates of a circumscribed rectangle.

Figure 17:
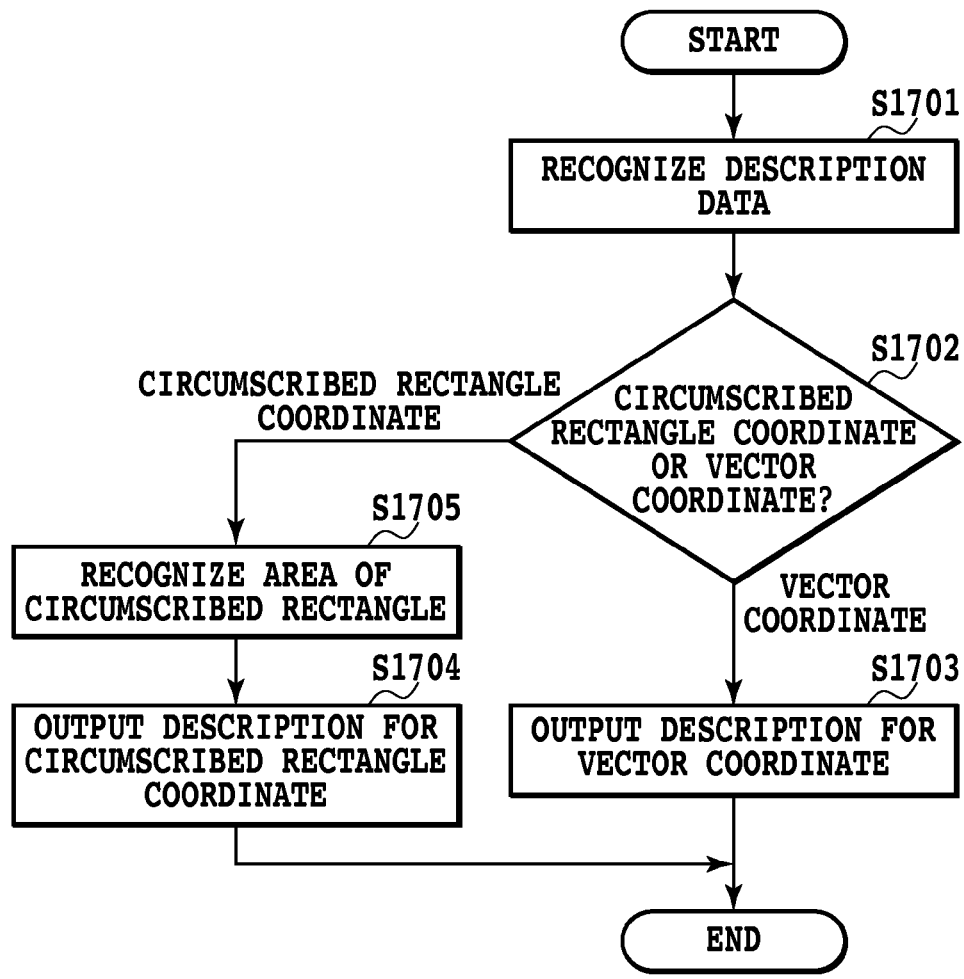
FIG. 17 is a diagram showing a flowchart of an outputting component in the fourth embodiment.

In addition, it is not necessary for the bit precision of the coordinates of a circumscribed rectangle to be constant, and it may be changed appropriately. The processing to change the bit precision of the coordinates of a circumscribed rectangle will be described using the flowchart in FIG. 17.

A difference from the processing in FIG. 16 described above is that processing to recognize the size (area) of a circumscribed rectangle is inserted between the processing to determine whether the recognized coordinates are the coordinates of a circumscribed rectangle or the coordinates of vector data and the processing to perform the output description for the circumscribed rectangle coordinate. Because of this, the area recognition processing will be described mainly.

In S1702, when the result of determination is the coordinates of a circumscribed rectangle, the processing to recognize the area of the circumscribed rectangle is performed (S1705) rather than performing immediately its output description processing (S1704). Then, the output description processing for the circumscribed rectangle coordinate is performed based on the recognized area, which is the result of recognition of the processing (S1704). Specifically, as to the precision of the coordinates of a circumscribed rectangle, the correspondence relationship between the area of the circumscribed rectangle and the bit precision is determined in advance and the output description is performed with the bit precision obtained therefrom. For example, when it is determined in advance that when the area of a circumscribed rectangle is ten or less, the float precision is used and when the area is larger than ten, the int precision is used, if the area is eight, the output description of the coordinates of the circumscribed rectangle is performed with the float precision according to the correspondence relationship.

As described above, an illustration region is extracted from the document read by a scanner etc. and vectorized data is created from the image data of the illustration region.

Then, an arbitrary illustration region is divided into color regions for each color that appears and contour lines for each color region and they are vectorized into a single unit, and thus, it is made possible to attach a circumscribed rectangle in units of contour lines by splitting up the group when reusing them.

Figure 19:
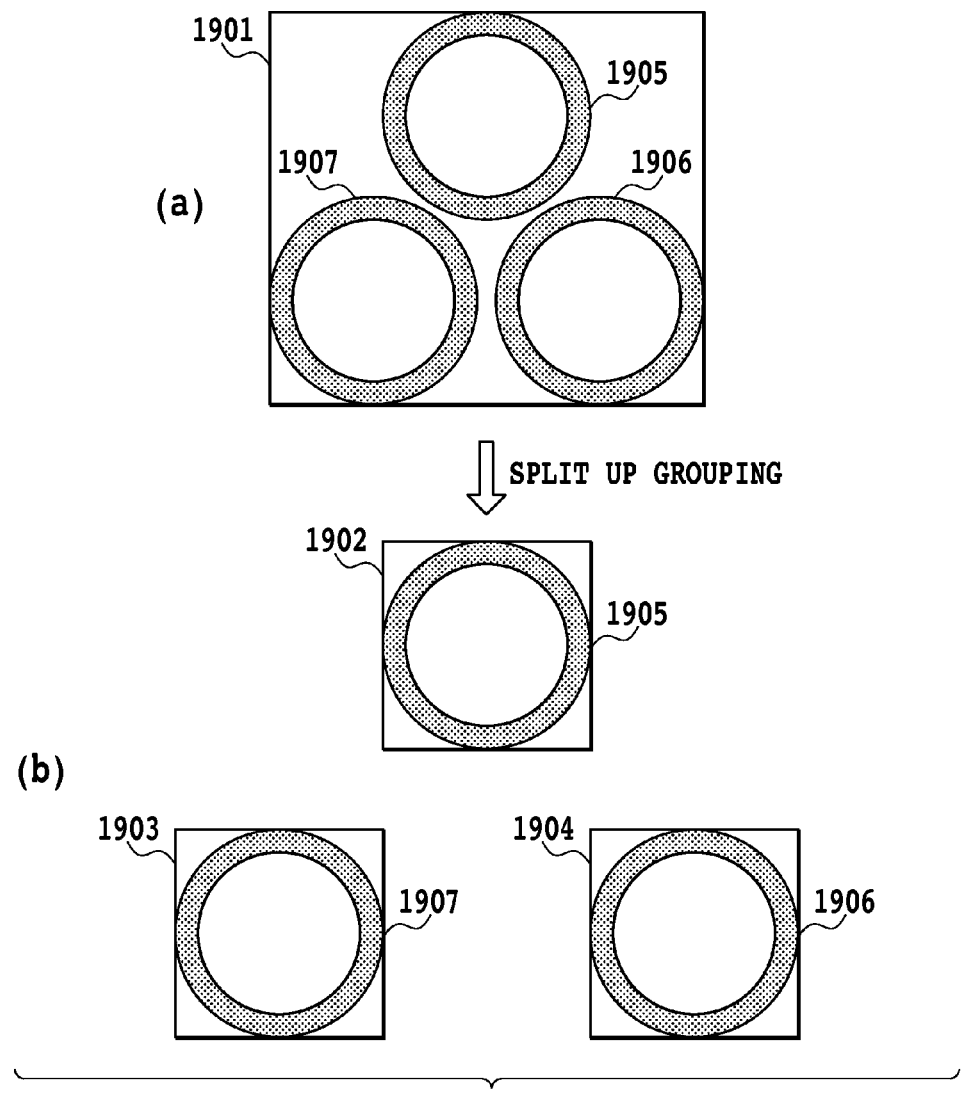
FIG. 19 is a diagram showing an example of a solution of the problem to which the present invention is applied.

FIG. 19 shows a specific example of a circumscribed rectangle that is attached when the group of the illustration regions vectorized according to the present embodiment is split up. Reference number 1901 in FIG. 19(*a*) denotes a rectangular region that has been divided and cut out as an illustration region. The rectangular region includes three elements as in FIG. 18 and one illustration region is composed of the combination of these elements. That is, one illustration region is composed of three drawn rings 1905, 1906, and 1907 almost in contact with one another, the distance between one ring and the other two rings being substantially the same.

Each of the elements 1905 to 1907 is one extracted as a separate figure (contour line) and vectorized as one illustration region. FIG. 19(*b*) shows the vectorized data in a state where the group is split up. In FIG. 19(*b*), a circumscribed rectangle is attached to each of the elements 1905, 1906 and 1907, respectively. Due to this, the range that can be reused in a vector state is made clear and the visual recognizability and operability when the group is split up are improved.

It can be conceived to use arbitrary graphics editing software in the local PC 102 connected to the MFP 100 via the LAN 107 for the reusing task, however, it may also be possible to let the MFP itself have such an editing function. It may also be possible to temporarily store vector data in a recording medium, such as a floppy (registered trademark) disc and USB memory, and use another PC etc. that is independent and not connected via a LAN etc.

[Second Embodiment]

A second embodiment of the present invention will be described. Here, the description of the configuration common to that in the first embodiment is omitted and processing will be described with the characteristic points of the second embodiment being focused on.

Figure 13:
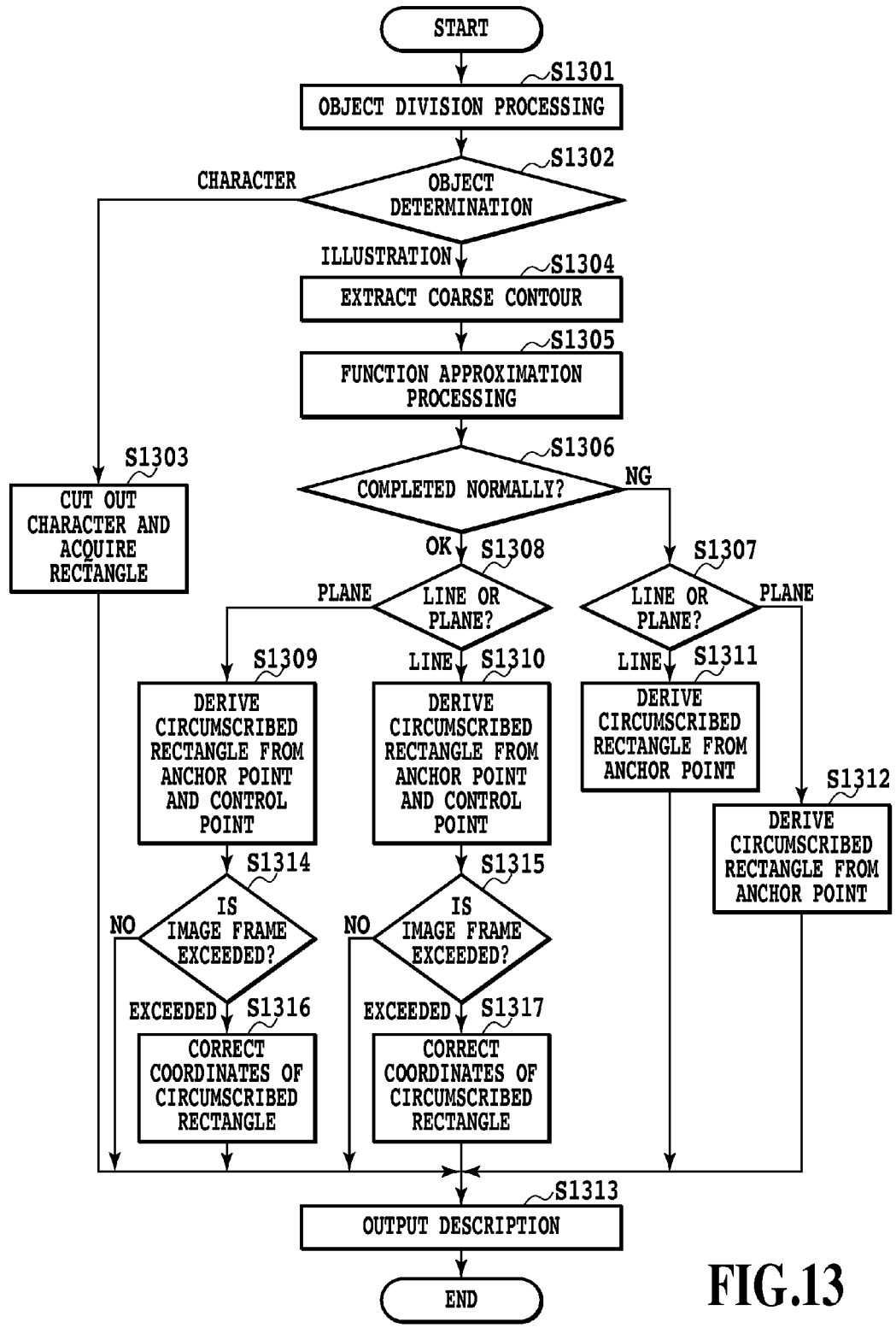
FIG. 13 is a diagram showing a flowchart of a second embodiment.

The configuration of an image processing apparatus in the second embodiment is also shown by the block diagram shown in FIG. 7. FIG. 13 is a flowchart showing an outline of the processing of the image processing apparatus according to the second embodiment.

What is different from the processing in the first embodiment is processing after the processing in which a circumscribed rectangle is derived in S1309 and S1310 (S1314 to S1317). Because of this, the description of each of processing from S1301 (object division processing) to S1312 (processing to derive a circumscribed rectangle from a plane coarse contour) to the output description processing in S1313 is omitted.

Figure 20:
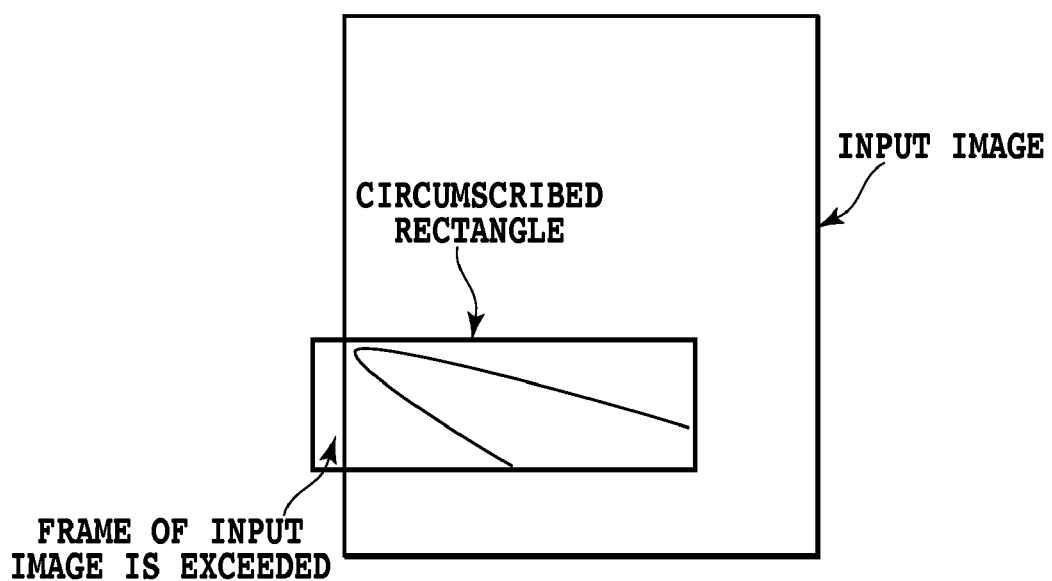
FIG. 20 is a diagram showing a relationship between an input image and a circumscribed rectangle.

First, the processing in S1314 is performed after a rectangle circumscribing the plane vector is derived in S1309. In S1314, input image inside/outside frame determination is performed, which determines whether or not the control point (s) is inside the frame of the input image. When the circumscribed rectangle is not fitted within the frame of the input image but extending in the direction of width or height and even if part of the circumscribed rectangle is located outside the frame of the input image, it is determined that the circumscribed rectangle is outside the frame. FIG. 20 shows a state where the circumscribed rectangle protrudes in the direction of width of the input image.

On the other hand, when the circumscribed rectangle is fitted within the frame of the input image, the procedure is advanced to S1313 with no action and the output description processing of the vector data to which the coordinates of a circumscribed rectangle are attached is performed.

Figure 21:
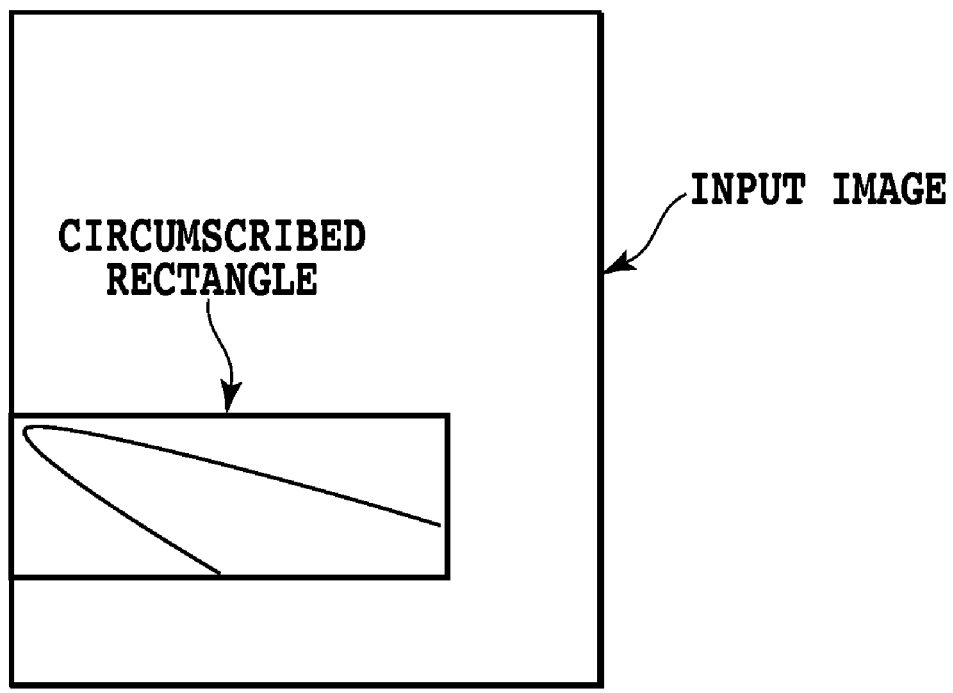
FIG. 21 is a diagram showing an example in which a circumscribed rectangle is corrected in accordance with an input image.

In S1314, when it is determined that the circumscribed rectangle protrudes from the input image, the procedure is advanced to the correction processing of circumscribed rectangle coordinate in S1316. The correction of the circumscribed rectangle coordinate is made by modifying the coordinates in the direction of width and height of the part that protrudes from the frame of the input image and performing processing to replace the coordinates with others so that the circumscribed rectangle is fitted within the frame of the input image. For example, the coordinates of the circumscribed rectangle are modified in the direction of width or in the direction of height, or in both directions so that the circumscribed rectangle is included in the frame of the input image with a certain distance apart from the outline of the frame of the input image. In addition, what is required is that the circumscribed rectangle be within the frame of the input image, and therefore, it may also be possible to align the end of the circumscribed rectangle with that of the frame of the input image so that the circumscribed rectangle is included in the frame. FIG. 21 shows the circumscribed rectangle the end of which is aligned with that of the frame of the input image by correcting the protruding part of the circumscribed rectangle in FIG. 20.

When the correction processing of the circumscribed rectangle coordinate is completed, the procedure is advanced to S1313 and the output description processing of the vector data to which the corrected coordinates of the circumscribed rectangle are attached.

Exactly the same processing is performed in S1315 and S1317 after a rectangle circumscribing the line vector is derived in S1310. That is, whether or not the circumscribed rectangle of the line vector protrudes from the frame of the input image is determined (S1315) and when it protrudes, the processing to correct the coordinates of the circumscribed rectangle is performed (S1317).

Here, for the circumscribed rectangle of the plane coarse contour and the line coarse contour, the processing to determine whether or not the circumscribed rectangle protrudes from the frame of the input image as described above or the subsequent correction processing are not performed. This is because the circumscribed rectangle is derived by only the anchor point(s) in the case of the coarse contour and it can never happen that a circumscribed rectangle protruding beyond the frame of the input image is derived.

In the flowchart in FIG. 13, the determination as to whether or not the coordinates of the circumscribed rectangle exceed the width and height of the image is made after a circumscribed rectangle is attached. However, it may also be possible to make the determination in the stage in which a circumscribed rectangle is derived and correct in accordance with the determination result, and then attach a circumscribed rectangle.

[Third Embodiment]

A third embodiment of the present invention will be described. Here, the description of the configuration common to that in the first and second embodiments is omitted and processing will be described with the characteristic points of the third embodiment being focused on.

Figure 14:
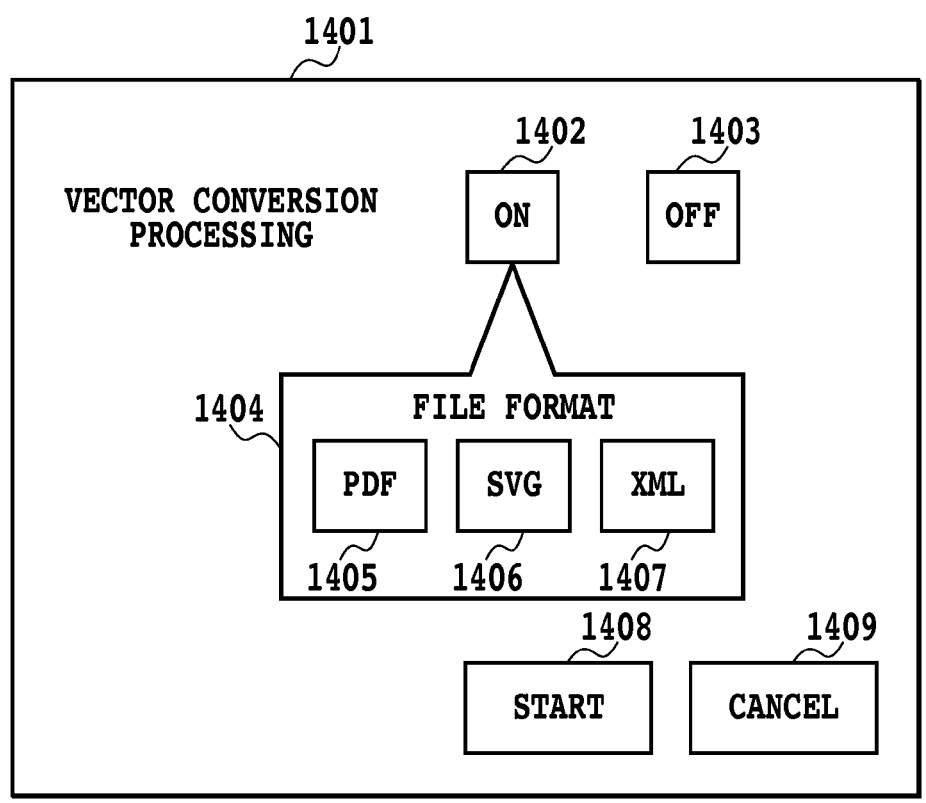
FIG. 14 is a diagram showing an example of a user interface in a third embodiment.

FIG. 14 is an outline diagram showing a configuration of a user interface in the present embodiment. Reference number 1401 denotes a user interface screen. Reference number 1402 denotes a button that is selected when vector conversion processing is performed and reference number 1403 denotes a button that is selected when vector conversion processing is not performed. When the button 1402 for performing vector conversion processing is selected, a file format selection screen 1404 is displayed overlapping the user interface screen 1401. It may also be possible to design the system so that the file format selection screen 1404 itself is displayed initially and becomes selectable after the button 1402 is turned ON. The file format selection screen 1404 shows three items, that is, PDF 1405, SVG 1406, and XML 1407. It is not necessarily required that the number of selectable file formats be limited to three, that is, this is only an example. When any one of the file formats is selected from the alternatives displayed on the file format selection screen 1404 and a start button 1408 is selected subsequently, vector conversion processing is performed. To cancel the selected file format, select a cancel button 1409.

Figure 15:
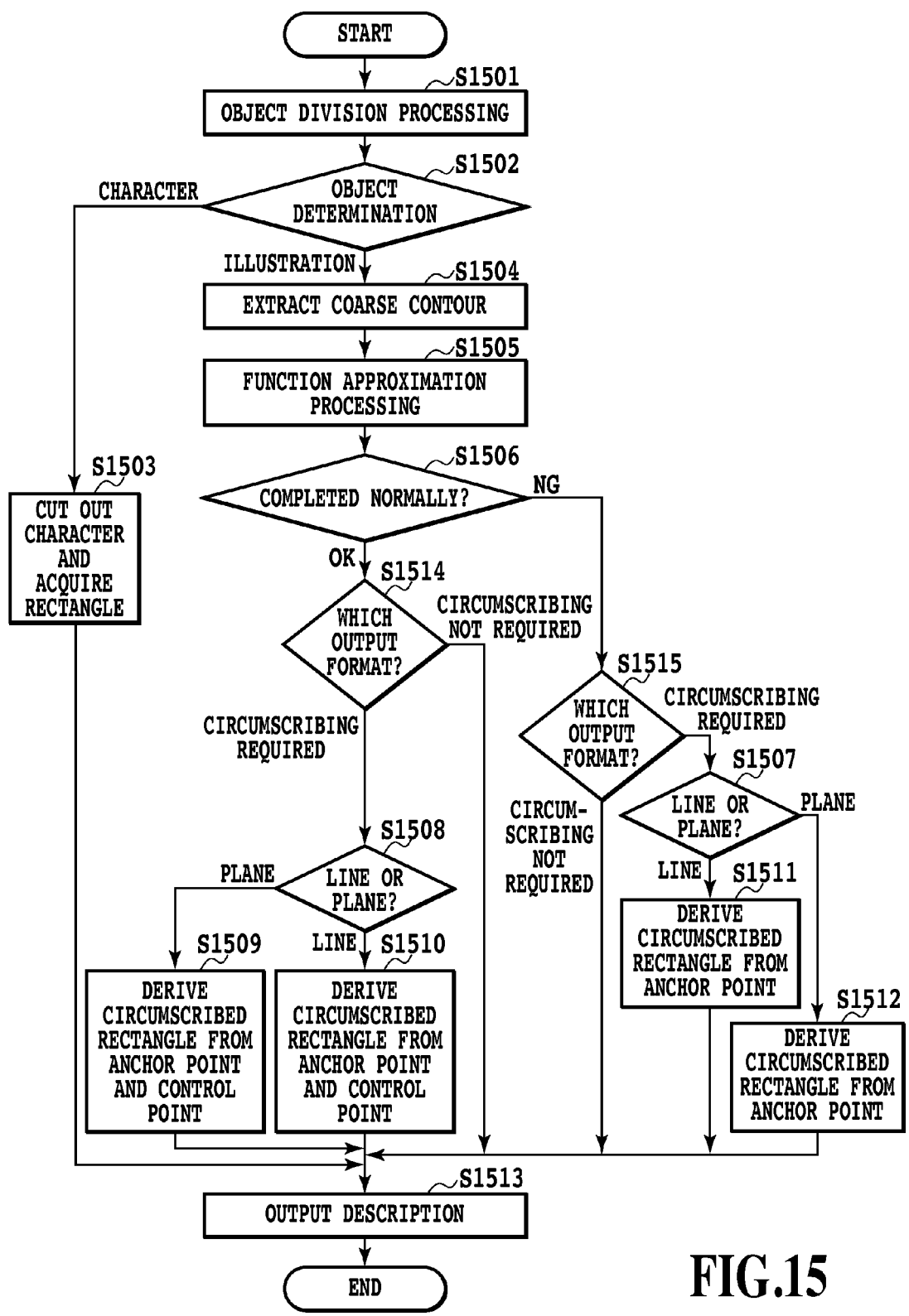
FIG. 15 is a diagram showing a flowchart of the third embodiment.

The processing in accordance with an instruction from the user interface described as above is shown in the flowchart in FIG. 15.

In the user interface screen, when the button 1402 for performing vector conversion processing is selected, the processing in FIG. 15 is started.

Figure 8:
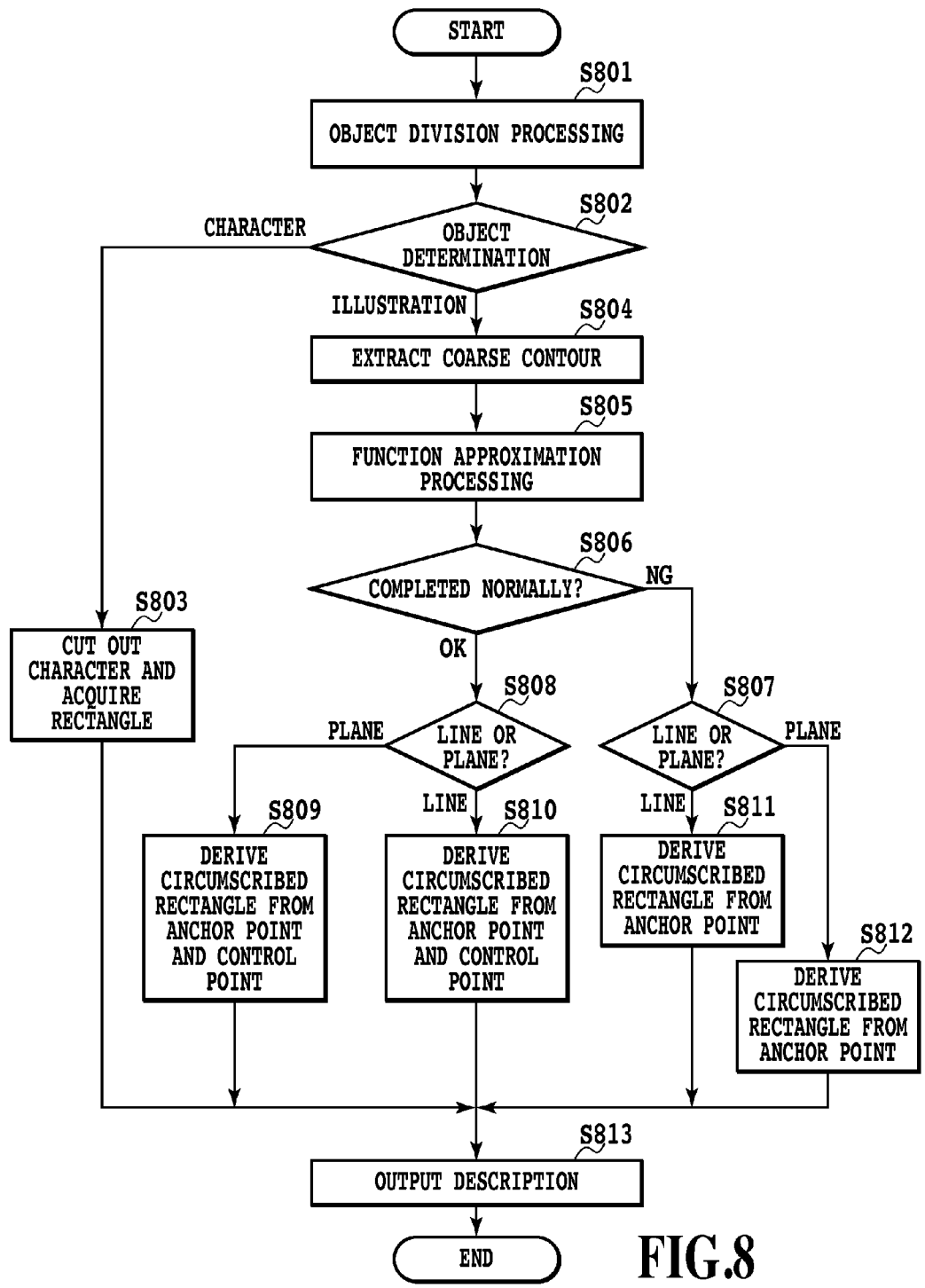
FIG. 8 is a diagram showing a flowchart of the first embodiment.

The processing in FIG. 15 differs from the processing in FIG. 8 in that processing to determine whether circumscribed rectangle derivation processing is necessary is inserted between the determination processing as to whether or not the function approximation processing has been completed normally and the processing to determine the kind of vector data (plane/line). Because of this, description is given below with the processing to determine whether circumscribed rectangle derivation processing is necessary (S1514 and S1515) being focused and the description of other processing is omitted.

When it is determined that the function approximation has been completed normally in S1506, the procedure is advanced to S1514 and processing to determine whether or not circumscribed rectangle derivation processing is necessary is performed. This determination is made by confirming the kind of file format (for example, SVG) selected at the same time when selecting the execution of vector conversion processing. For example, setting is made in advance so that when the file format is PDF or SVG, it is not necessary to derive a circumscribed rectangle and when the file format is XML, the derivation of a circumscribed rectangle is necessary. In this manner, the necessity of the derivation of a circumscribed rectangle is set in advance for each kind of file format, and therefore, it is possible to determine whether or not circumscribed rectangle processing is necessary by confirming the kind of file format and change the format.

In the example described above, when PDF is selected in the user interface, it is set in advance that the circumscribed rectangle derivation processing is not necessary, and therefore, the output description of vector data is performed immediately (S1513). When XML is selected in the user interface, circumscribed rectangle derivation processing is necessary, and therefore, the procedure is advanced to S1508 and kind discrimination processing of vector data, which is its previous stage, is performed.

The processing when it is determined that the function approximation has not been completed normally in S1506 is substantially the same. That is, the procedure is advanced to S1515 and whether or not circumscribed rectangle derivation processing is necessary is determined, and according to the result of the determination, the output description of vector data is performed immediately (S1513) or the kind discrimination processing of vector data is performed (S1507).

As described above, although the three embodiments are described in detail, it may also be possible for the present invention to assume an embodiment as a system, device, method, program, recording medium, etc. Specifically, the present invention can be applied to a system including a plurality of units or can be applied to a device including only one unit.

In addition, the present invention also includes the case where the programs of software that realize the function of the above-described embodiments (programs corresponding to the flowchart shown in the drawings in the embodiments) are supplied directly or remotely to a system or device, and then a computer of the system or device reads and executes the supplied program code.

Consequently, the program code itself, which is installed in a computer in order to realize the functional processing of the present invention by the computer, also realizes the present invention. That is, the present invention also includes the computer programs themselves for realizing the functional processing of the present invention.

In this case, the programs may have a form of object code and may be those executed by an interpreter or script data to be supplied to OS, etc., provided they have the function of program.

Recording media for supplying programs include, for example, a floppy (registered trademark) disc, hard disc, and optical disc. Recording media further include a magneto-optical disc, MO, CD-ROM, CD-R, CD-RW, magnetic tape, nonvolatile memory card, ROM, DVD (DVD-ROM, DVD-R), and so on.

The method for supplying programs may also include one in which a client computer accesses a homepage in the Internet using its browser then downloads the computer programs themselves of the present invention or a compressed file including an automatically installing function into a recording medium, such as a hard disc, from the connected homepage. In addition, it is also possible to realize the supply of programs by dividing the program code constituting the programs of the present invention into a plurality of files and downloading the respective files from different homepages. That is, a WWW server from which a plurality of users downloads the program files to realize the functional processing of the present invention by a computer is also included in the present invention.

It is also possible for a user to realize the present invention by distributing the programs of the present invention, which are encoded and stored in a recording medium, such as CD-ROM, and allowing users that pass certain conditions to download key information that decrypts the encryption from a homepage via the Internet, and then causing the user to execute the encrypted programs using the key information and install the programs.

In addition, the functions of the above-described embodiments are realized by a computer executing the read programs. Further, the functions of the above-described embodiments can be realized by the processing of an OS etc. that runs on a computer and performs part or all of the actual processing based on the instruction of the programs.

Furthermore, the functions of the above-described embodiments are realized by the processing of a CPU etc. provided on a function extension board inserted into a computer or a function extension unit connected to a computer, into a memory of which the programs read from a recording medium are written, performing part or all of the actual processing based on the instruction of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-189676, filed Jul. 23, 2008, which is hereby incorporated by reference herein in its entirety.

What is claimed is:

1. An image processing apparatus comprising:
   an illustration region specifying component configured to specify an illustration region within an input image;
   a vector data generating component configured to generate vector data from image data of the illustration region;
   a kind discriminating component configured to discriminate a kind of the generated vector data; and
   a circumscribed rectangle coordinate deriving component configured to derive circumscribed rectangle coordinates in accordance with the kind discriminated by the kind discriminating component.

2. The image processing apparatus according to claim 1, further comprising:
   a processing result determining component configured to determine whether or not the function approximation processing by the vector data generating component has been completed normally,
   wherein the vector data generating component generates vector data using function approximation processing, and
   wherein the circumscribed rectangle coordinate deriving component derives circumscribed rectangle coordinates in accordance with the determination result of the processing result determining component and the discrimination result of the kind discriminating component.

3. The image processing apparatus according to claim 1, further comprising:
   an input image inside/outside frame determining component configured to determine whether or not the coordinates derived by the circumscribed rectangle coordinate deriving component are inside a frame of an input image; and
   a component configured to correct the circumscribed rectangle coordinates derived by the circumscribed rectangle coordinate deriving component when the coordinates are determined to be outside the frame by the input image inside/outside frame determining component.

4. The image processing apparatus according to claim 1, further comprising:
   a processing result determining component configured to determine whether or not the function approximation processing by the vector data generating component has been completed normally; and
   an output format confirming component configured to confirm a format to be output; a component configured to change output processing in accordance with the format confirmed by the output format confirming component,
   wherein the vector data generating component generates vector data using function approximation processing, and
   wherein the circumscribed rectangle coordinate deriving component derives circumscribed rectangle coordinates in accordance with the processing result of the processing result determining component and the discrimination result of the kind discriminating component.

5. The image processing apparatus according to claim 1, wherein the kind discriminating component discriminates between a plane vector and a line vector.

6. The image processing apparatus according to claim 2, wherein the circumscribed rectangle coordinate deriving component derives circumscribed rectangle coordinates from the coordinates after having been subjected to the function approximation processing when the processing result determining component determines that the function approximation processing has been completed normally, or derives circumscribed rectangle coordinates from the coordinates before being subjected to the function approximation processing when the processing result determining component determines that the function approximation processing has not been completed normally.

7. The image processing apparatus according to claim 1, further comprising:
   a processing result determining component configured to determine whether or not the function approximation processing by the vector data generating component has been completed normally;

an area recognizing component configured to recognize an area of a circumscribed rectangle expressed by the circumscribed rectangle coordinates; and
a component configured to change precision with which the circumscribed rectangle coordinates are output, the coordinates being derived by the circumscribed rectangle coordinate deriving component in accordance with the recognition result of the area recognizing component,
wherein the vector data generating component generates vector data using function approximation processing, and
wherein the circumscribed rectangle coordinate deriving component derives circumscribed rectangle coordinates in accordance with the determination result of the processing result determining component and the discrimination result of the kind discriminating component.

8. The image processing apparatus according to claim 1, further comprising:
a color region extracting component configured to extract a color region from the illustration region specified by the illustration region specifying component; and
a contour line extracting component configured to extract a contour line from the color region extracted by the color region extracting component,
wherein the image data of the illustration region includes image data of the color region or image data of the contour line.

9. An image processing method using at least one processor to perform the steps of:
specifying an illustration region within an input image;
generating vector data from image data of the illustration region;
discriminating a kind of the generated vector data; and
deriving circumscribed rectangle coordinates in accordance with the kind discriminated in the kind discriminating step.

10. The image processing method according to claim 9, further comprising:
determining whether or not the function approximation processing by the generating step has been completed normally,
wherein the generating step includes generating vector data using function approximation processing, and
wherein the deriving step includes deriving circumscribed rectangle coordinates in accordance with the determination result of the determining step and the discrimination result of the discriminating step.

11. The image processing method according to claim 9, further comprising:
determining whether or not the coordinates derived in the deriving step are inside a frame of an input image; and
correcting the circumscribed rectangle coordinates derived in the deriving step when the coordinates are determined in the determining step to be outside the frame.

12. The image processing method according to claim 9, further comprising:
determining whether or not the function approximation processing in the generating step has been completed normally;
confirming a format to be output; and
changing output processing in accordance with the format confirmed in the confirming step,
wherein the generating step includes generating vector data using function approximation processing, and
wherein the deriving step includes deriving circumscribed rectangle coordinates in accordance with the processing result of the determining step and the discrimination result of the discriminating step.

13. The image processing method according to claim 9, wherein the discriminating step includes discriminating between a plane vector and a line vector.

14. The image processing method according to claim 10, wherein the deriving step includes deriving circumscribed rectangle coordinates from the coordinates after having been subjected to the function approximation processing when it is determined in the determining step that the function approximation processing has been completed normally, or derives circumscribed rectangle coordinates from the coordinates before being subjected to the function approximation processing when it is determined in the determining step that the function approximation processing has not been completed normally.

15. The image processing method according to claim 9, further comprising:
determining whether or not the function approximation processing in the generating step has been completed normally;
recognizing an area of a circumscribed rectangle expressed by the circumscribed rectangle coordinates; and
changing precision with which the circumscribed rectangle coordinates are output, the coordinates being derived by performance of the deriving step in accordance with the recognition result of the recognizing step,
wherein the generating step includes generating vector data using function approximation processing, and
wherein the deriving step includes deriving circumscribed rectangle coordinates in accordance with the determination result of the determining step and the discrimination result of the discriminating step.

16. The image processing method according to claim 9, further comprising:
extracting a color region from the illustration region specified in the specifying step; and
extracting a contour line from the color region extracted in the extracting step for extracting a color region,
wherein the image data of the illustration region includes image data of the color region or image data of the contour line.

17. A non-transitory computer-readable storage medium storing a program for causing a computer to perform an image processing method, the method comprising the steps of:
specifying an illustration region within an input image;
generating vector data from image data of the illustration region;
discriminating a kind of the generated vector data; and
deriving circumscribed rectangle coordinates in accordance with the kind discriminated in the kind discriminating step.

* * * * *